US010831693B1

(12) United States Patent
Huang et al.

(10) Patent No.: US 10,831,693 B1
(45) Date of Patent: Nov. 10, 2020

(54) MULTICAST MASTER

(71) Applicant: Amazon Technologies, Inc., Seattle, WA (US)

(72) Inventors: Randy Renfu Huang, Morgan Hill, CA (US); Ron Diamant, Albany, CA (US)

(73) Assignee: Amazon Technologies, Inc., Seattle, WA (US)

( * ) Notice: Subject to any disclaimer, the term of this patent is extended or adjusted under 35 U.S.C. 154(b) by 138 days.

(21) Appl. No.: 16/145,122

(22) Filed: Sep. 27, 2018

(51) Int. Cl.
  *G06F 13/42* (2006.01)
  *H04L 12/18* (2006.01)
  *G06N 3/02* (2006.01)

(52) U.S. Cl.
  CPC .......... *G06F 13/4208* (2013.01); *G06F 13/42* (2013.01); *G06N 3/02* (2013.01); *H04L 12/18* (2013.01); *G06F 2213/0022* (2013.01)

(58) Field of Classification Search
  CPC ........................................................ G06F 3/06
  USPC ........................................................ 710/306
  See application file for complete search history.

(56) References Cited

U.S. PATENT DOCUMENTS

| | | | | |
|---|---|---|---|---|
| 6,101,551 A * | 8/2000 | Kanoh | ................... | G06F 15/17 709/213 |
| 8,407,377 B1 * | 3/2013 | Shapiro | ............. | G06F 15/17331 710/23 |
| 9,619,423 B1 * | 4/2017 | Perry | .................... | G06F 13/404 |
| 2003/0012180 A1 * | 1/2003 | Donahue | ............ | H04B 7/18595 370/352 |
| 2004/0088376 A1 * | 5/2004 | McCanne | ........... | H04L 67/2828 709/219 |
| 2004/0186945 A1 | 9/2004 | Jeter, Jr. et al. | | |
| 2005/0007969 A1 * | 1/2005 | Hundscheidt | ......... | H04L 12/185 370/312 |
| 2006/0239290 A1 * | 10/2006 | Lin | ........................ | H04L 45/00 370/432 |
| 2012/0066423 A1 * | 3/2012 | Choo | .................. | G06F 13/4291 710/110 |
| 2012/0197965 A1 * | 8/2012 | McCanne | ............... | H03M 7/30 709/202 |
| 2013/0086320 A1 | 4/2013 | Black et al. | | |
| 2016/0342329 A1 | 11/2016 | Shapiro et al. | | |
| 2017/0185327 A1 * | 6/2017 | Powell | .................. | G06F 3/0619 |
| 2017/0235515 A1 | 8/2017 | Lea et al. | | |
| 2017/0336989 A1 * | 11/2017 | Zawodny | .............. | G06F 3/0659 |
| 2017/0337468 A1 | 11/2017 | Bruestle et al. | | |

(Continued)

OTHER PUBLICATIONS

U.S. Appl. No. 16/145,135, filed Sep. 27, 2018 "Target Port With Distributed Transactions".

*Primary Examiner* — Titus Wong
(74) *Attorney, Agent, or Firm* — Kilpatrick Townsend & Stockton LLP

(57) ABSTRACT

Provided are integrated circuit devices and methods for operating integrated circuit devices. In various examples, an integrated circuit device can include a master port operable to send transactions to a target components of the device. The master port can have point-to-point connections with each of the targets. The master port can be configured with a first address range for a first target, a second address range for a second target, and a multicast address range for both the first and second target. When the master port receive a request with an address that is in the multicast address range, the master port can generate, for the one request, a transaction for each of the first and second transactions.

23 Claims, 14 Drawing Sheets

(56) References Cited

U.S. PATENT DOCUMENTS

2019/0324759 A1     10/2019  Yang et al.
2019/0325305 A1     10/2019  Zhang et al.
2019/0340491 A1*    11/2019  Norden .................. G06N 3/063

* cited by examiner

```
┌─────────────────────────────────────────────────────────────┐
│ Receiving a request to transmit a transaction, the request  │
│ including an address                                        │
│ 1102                                                        │
└─────────────────────────────────────────────────────────────┘
                              │
                              ▼
┌─────────────────────────────────────────────────────────────┐
│ Determining that the address is within a multicast address  │
│ range configured for the integrated circuit device, wherein │
│ the integrated circuit device is further configured with a  │
│ first address range for a first target and a second address │
│ range for a second target, and wherein the master port has  │
│ point-to-point connections with a plurality of targets      │
│ including the first target and the second target            │
│ 1104                                                        │
└─────────────────────────────────────────────────────────────┘
                              │
                              ▼
┌─────────────────────────────────────────────────────────────┐
│ Generating a first transaction for the request, the first   │
│ transaction including a first address that corresponds to   │
│ the address                                                 │
│ 1106                                                        │
└─────────────────────────────────────────────────────────────┘
                              │
                              ▼
┌─────────────────────────────────────────────────────────────┐
│ Generating a second transaction for the request, the second │
│ transaction including a second address that corresponds to  │
│ the address                                                 │
│ 1108                                                        │
└─────────────────────────────────────────────────────────────┘
                              │
                              ▼
┌─────────────────────────────────────────────────────────────┐
│ Transmitting the first transaction on a point-to-point      │
│ connection to the first target                              │
│ 1110                                                        │
└─────────────────────────────────────────────────────────────┘
                              │
                              ▼
┌─────────────────────────────────────────────────────────────┐
│ Transmitting the second transaction on a point-to-point     │
│ connection to the second target                             │
│ 1112                                                        │
└─────────────────────────────────────────────────────────────┘
```

Receiving a write transaction for a memory of the integrated circuit device, the write transaction including an address, data, and an offset value, wherein the memory includes a plurality of banks, wherein the target port has point-to-point connections with a plurality of master ports, wherein the target port is configured with a multicast address range, wherein the multicast range is associated with a plurality of indices corresponding to banks from the plurality of banks
1202

Determining that the address is in the multicast address range
1204

Determining a first index from the plurality of indexes
1206

Determining a second address by combining the first index and the offset value and adding a result to the address
1208

Writing the data to the memory using the second address, wherein using the second address shifts the data from a location indicated by the address
1210

FIG. 12

MULTICAST MASTER

BACKGROUND

Integrated circuit devices, such a processors, can include an internal communication fabric for moving data between components of the device. For example, the communication fabric can enable a transaction initiator to send a read transaction or a write transaction to a transaction recipient. In this example, the communication fabric can further enable the transaction recipient to send responses back to the transaction initiator. To communicate over the communication fabric, the transaction initiator can include an interface circuit, referred to herein as a master port. The transaction recipient can also include an interface circuit, referred to herein as a target port.

In various examples, the communication fabric can implement standardized bus protocol. Using a standardized bus protocol can simplify the implementation of the integrated circuit, because the expected behavior of the communication fabric will be provided by the bus protocol, and only needs to be verified for adherence to the protocol. Additionally, interface circuits can be reused from previous designs, and/or may be provided as part of the bus protocol.

In some examples, moving data between components of an integrated circuit device can include moving the same data into different components. For example, a set of data may be read from a first location, and be written to a second and third location, with the second and third location receiving copies of the same data. In various examples, moving the same data can be accomplished, for example, by having a transaction initiator generate a write transaction for each of the locations that is to receive the data.

BRIEF DESCRIPTION OF THE DRAWINGS

Various embodiments in accordance with the present disclosure will be described with reference to the drawings, in which:

FIG. 8 is a diagram illustrating another example of the contents of memory banks;

FIG. 11 illustrates an example of a process for operating an integrated circuit device that includes a master port that has been configured to enable the master port to perform multicast transactions; and FIG. 12 illustrates an example of a process for operating an integrated circuit device that includes a target port that has been configured to enable multicast transactions and staggered data writes.

DETAILED DESCRIPTION

Figure 1:
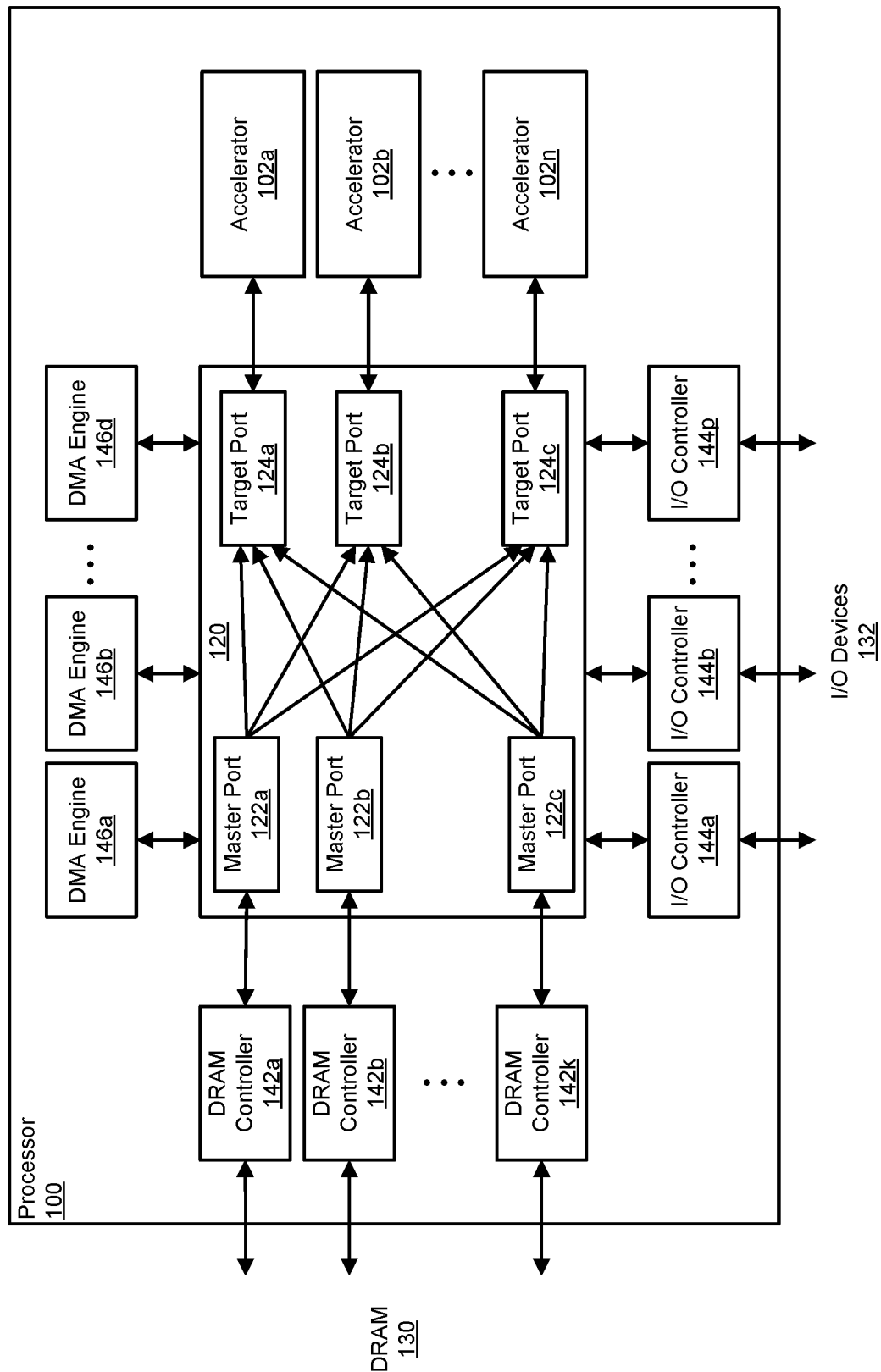
FIG. 1 includes a block diagram that illustrates an example of a processor.

A processor is an integrated circuit device that is capable of executing the instructions of a computer program. In various examples, a processor can include a number of accelerators, which can be integrated circuit components that are optimized to execute particular operations. For example, floating point accelerators can be optimized to execute floating point arithmetic, graphics accelerators can be optimized to perform graphics rendering, and neural network accelerators can be optimized to execute neural networks. In these and other examples, the accelerators can quickly perform some operations, while other operations can be handled by other components of the processor.

A processor with multiple accelerators can use the accelerators to perform multiple operations simultaneously. For example, when some of the accelerators are neural network processing engines, the processor can simultaneously execute a neural network on each of these accelerators. This ability can be particularly advantageous when input data is batch processed. In batch processing, input data of the same type is collected, and once a certain amount of input data is stored, a result for each is computed. The results may require performing the same operation on each of the input data. For example, the input data can be images, and the operation can include inputting each image into a neural network that is configured to perform image recognition. In this example, instead of serially inputting the pictures into one neural network processing engine, copies of the data for the neural network can be loaded into different neural network processing engines, which can then execute the neural network simultaneously on different input data. Batch processing can make better use of the neural network processor by keeping the neural network processing engines busy instead of waiting for new input data to be received.

Data and instructions for an accelerator can be stored in a computing system's main memory, and can be loaded as needed into an accelerator. Thus, when configuring the accelerators of a processor with the same data and instructions, such as when batch processing, it may be necessary to read the same data for each time the data is written to an accelerator. Loading data into an accelerator can be a very slow operation, however, relative to the speed at which the accelerator can produce a result of a given set of input data. For example executing a neural network can take an accelerator tens of microseconds, while loading the accelerating can take tens of milliseconds. Additionally, the amount of bandwidth available for moving data from main memory and into an accelerator may be limited, due, for example, to physical limitations such as the number of signals that can be wired between the memory and other components in the system and the speed at which the signals can be clocked, among other issues. Thus, loading data into a processor's accelerators may need to be a serial operation, which can greatly reduce speed gained through batch processing.

One possible solution for reducing the memory bandwidth usage in situations such as is described above, is for the data to only be read once and then be distributed to each target (e.g., the neural network processing engines). The internal communication fabric of the device, however, may not have this capability.

The internal communication fabric of the integrated circuit device can be implemented using a standardized bus protocol; that is, a bus protocol that has a well-defined and well-understood specification. Using a standardized bus protocol can simplify the implementation of the device because the expected operation of the communication fabric is known, and need only be verified as functioning according to the standard. Additionally, use of a standardized bus protocol enables inter-operability with other devices that use the same standard.

An often used standardized bus protocol is the Advanced eXtensible Interface (AXI) standard, due to this standard's suitability for high-performance and high speed implementations. AXI and similar standards, however, do not support multicast transactions. In an integrated circuit that uses the AXI standard, to send the same data to more than one target on the fabric, the sender would have to fetch the data from memory each time, and generate separate write transactions for each target. The efficiency gained in being able to execute many neural networks simultaneously may thus be reduced by the time needed for the data for the neural networks to be loaded.

Additional inefficiency may be caused by the structure of some neural networks. In various examples, utilization of the computational array of a neural network processing engine approximates the overall performance of the engine. For example, when the computational array is at 75% utilization, then the neural network processing engine may be operating at approximately 75% of the engine's possible maximum capability. Maintaining high utilization of the computational array can thus maximize the speed at which the computations for a neural network are performed, how quickly the task for which the neural network is trained can be completed, and the how quickly answers can be produced from the neural network.

In some examples, a neural network may be operated such that a filter can be applied to input feature maps using different rows of the neural network processor's computational array. For example, when the inputs to a layer of a neural network includes more than one input feature map, each input feature map can be input into a different row, and the processing engines in the row can apply a particular filter to each of the input feature maps. Additionally, output feature maps can computed on the columns of the computational array. This arrangement may be particularly efficient when the horizontal operation of the computational array is a multiplication and the vertical operation is an accumulation. This arrangement can also memory efficient, because the values for an input feature map can be written to sequential locations in a memory that is used to feed data into the computational array.

In some convolutional neural networks, however, the first layer includes only three input feature maps, one each for the red channel, the green channel, and the blue channel (which may be present, for example, in a color image) of the input data set. Convolutional neural networks are used for tasks such as image recognition, speech recognition, and machine translation, among other tasks, and are favored for over other neural network architectures due to being able to produce more accurate results. For these neural networks, the first layer of the network may only occupy the first three rows of the computational array, one for each input feature map, leaving the remaining rows idle until the next layer. As an example, for a computational array that has 128 rows and 64 columns, using just three rows of the computational array to compute an output for the first layer of a neural network can result in 2.3% utilization for the first layer's computations.

Though the first layer of a neural network may occur only once during the execution of the neural network, over the course of multiple executions of the neural network (referred to as inference or conducting inference) the low utilization by the first layer can have an impact. As an example of the impact, Table 1 below illustrates the utilization of a 128 row, 64 column computational array when the array executes various example neural networks. Illustrated in this example is the average utilization of 8-bit unsigned integer computational units in the computational array and 16-bit floating point computational units over many inputs for each neural network.

TABLE 1

| Neural Network | UINT8 utilization | FP16 utilization |
|---|---|---|
| Resnet-34 | 44% | 45% |
| Resnet-50 | 40% | 40% |
| Resnet-152 | 66% | 66% |
| Inception_v3 | 23% | 24% |

One solution for increasing the utilization of the computational array when computing the first layer is to use the idle rows to apply different filter elements to the input feature maps. A filter applied to an input feature map can include an array of filter elements. As an example, instead of sequentially applying each filter element in the filter to an input feature map, multiple feature elements can be applied in parallel. In this example, it may thus be possible to occupy six rows of the computational array to apply two filter elements, nine rows to apply three filter elements, and so on. As an example, for a computational array that has 128 rows and 64 columns, replicating three input feature maps 24 times can result in a utilization of 57% for the first layer. Table 2 below illustrates examples of the utilization that is theoretically possible when the input feature maps of the first layer are duplicated across multiple rows and different filter elements are applied to the duplicates:

TABLE 2

| Neural Network | UINT8 utilization | FP16 utilization |
|---|---|---|
| Resnet-34 | 89% | 92% |
| Resnet-50 | 84% | 86% |
| Resnet-152 | 91% | 92% |
| Inception_v3 | 71% | 76% |

To enable multiple filter elements to be applied to the multiple copies of the input feature maps of the first layer, the neural network processing engine can have multiple copies of the input feature maps arranged for inputting into the rows of the computational array. The neural network processing engine can include a memory, which can also be referred to as a buffer, that holds data for inputting into the computational array. In some examples, software that is operating the neural network processing engine can load multiple copies of the input feature maps into the memory, with the copies arranged in the memory for inputting into different rows of the computational array. In these examples, the neural network processing engine would not need any additional circuitry for multiple copies of the input feature maps to be input into the computational array, and only needs to be appropriately programmed in order to improve overall utilization of the computational array.

Loading the same data multiple times into the same neural network processing engine, however, results in the same problem discussed above, in that memory bandwidth is limited and a large of time can be spent loading data while only a little time is needed to compute a result.

Memory bandwidth delay can reduce the utilization that is gained by replicating the input feature maps. For example, in an example neural network processor, the available memory bandwidth can be 32 gigabytes (GB) per second (GB/s), and an input color image can be about 300 kilobytes (KB) in size. In this example, copying the input image 24 times can take about 0.23 milliseconds (ms). Executing the neural networks listed in Table 1 and Table 2 above may take about 26 microseconds (µs), meaning that the utilization gain from copying the input image is reduced. Table 3 below illustrates practical examples of computational array utilization, where the time needed to copy the input image 24 times is included:

TABLE 3

| Neural Network | UINT8 utilization | FP16 utilization |
| --- | --- | --- |
| Resnet-34 | 64% | 66% |
| Resnet-50 | 60% | 61% |
| Resnet-152 | 80% | 81% |
| Inception_v3 | 41% | 43% |

In various implementations, provided are systems, methods, and integrated circuit devices that include a communication fabric to enable multicast transactions and staggered distribution of the transaction data across the memory of an accelerator. Multicasting a transaction can enable data to be read once from memory and be written to multiple targets. Staggered distribution of the transaction data can enable the data to be duplicated across banks in a memory, so that the data can be more effectively used in a systolic array computations.

In various examples the communication fabric can include a master port, which can be used by a device to drive transactions onto a communication fabric. The master port can be configured with the address ranges of devices on the fabric, which the master port can use to determine the destination for a transaction. In various implementations, the master port can also be configured with a multicast address range, which can include two or more targets on the communication fabric. The master port can, for example, be configured with a first address range for a first target and a second address range for a second target, where the first and second address ranges can be used for sending individual transactions to each of the first and second targets, respectively. In this example, the master port can further include a third, multicast address range, which can map to both the first target and the second target. When an address falls within the multicast address range in this example, the master port can generate two transactions, one each for the first target and the second target. In this and other examples, the multicast address range, and modifications to the master port to support the multicast address range, can enable data to be read once and written to multiple targets.

In various examples, multicasting to multiple targets can be used when the same data is being loaded into multiple different accelerators. In these examples, the data can be read once, and a multicast-enabled master port can generate multiple write transactions, one for each accelerator.

In various examples, multicasting can also be used to copy the same data multiple times into the memory of one accelerator. For example, for one read of the data, a multicast-enabled master port can generate multiple transactions to the accelerator. In this example, the master port can include a multicast address range that can be used to identify a transaction that will generate multiple transactions to the one accelerator. A target port of the accelerator, at which the accelerator can receive transactions from the communication fabric, can then distribute the multiple transactions to appropriate locations of the accelerator's memory. For example, the target port can also be configured with the multicast address range used by the master port, where the multicast address range at the target port is associated with a set of memory banks. In this and other examples, when the target port received a transaction address to the multicast address range, the target port can use indices that identify the memory banks to distribute the transactions to the memory banks.

In various examples, multicasting to multiple accelerators, and distributing multicast transactions within an accelerator, can be combined. For example, a master port can be configured with a multicast address range that results in the master port generating multiple transactions to different accelerators, as well as multiple transactions to each accelerator, where the multiple transactions to one accelerator can be distributed within the accelerator by the accelerator's target port.

In various examples, transactions that distribute data within an accelerator can further adjust the placement of the data according to a systolic array computation that the accelerator will perform. As discussed further below, a systolic array computation can require that data enter a computational array at a particular time and in a particular order. Placing identical copies of the data to be input into the computational array can thus require the accelerator to have additional circuitry to arrange the data as needed. Thus, in various examples, the master port can provide the target port with an offset value, that enables the target port to change the placement of the data when distributing the data to different memory banks. The offset value can thus be used to arrange the data so that the accelerator does not need extra hardware to configure the data for inputting into the computational array.

Various examples will be described herein. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

FIG. 1 includes a block diagram that illustrates an example of a processor 100 that has multiple accelerators 102a-102n that enable the processor 100 to perform calculations on input data. The accelerators represent computational engines that can operate independently of one another and concurrently. In various examples, the accelerators can perform the same computations on different input data. The accelerators can be neural network processing engines, such as the neural network processing engine discussed below, and/or can be other types of accelerators, such as floating point accelerators or graphics accelerators. In the illustrated example, the processor 100 includes n accelerators 102a-102n.

The example processor 100 further includes DRAM controllers 142a-142k for communicating with processor memory, implemented in this example using DRAM 130. In the illustrated example, the processor 100 includes k DRAM controllers 142a-142k, each of which may be able to communicate with an independent set of banks of DRAM. In other examples, other types of RAM technology can be used for the processor memory. The DRAM controllers 142a-142k can also be referred to as memory controllers.

In various examples, program code for the accelerators 102a-102n can be stored in the DRAM 130. The program code can include the data and instructions for executing a neural network, for example. The neural networks can include different neural networks optimized for different tasks. For example, one neural network can be optimized for speech recognition, another for machine translation, and another for image recognition. In these and other examples, the processor 100 can move or copy the data for the appropriate neural network from the DRAM 130 to an accelerator that implements a neural network processing engine, and can then instruct the accelerator to execute the neural network. In some examples, the processor 100 can be configured to preload neural networks on the accelerators. That is, some or all of the weights for different neural networks can be loaded onto different accelerators 102a-102n before any input data is received, so that the accelerators 102a-102n are ready to execute a respective neural network as soon as the processor 100 receives input data.

The example processor 100 further includes I/O controllers 144a-144p for communicating with I/O devices 132 in the system. The processor 100 can communicate with I/O devices over, for example, a processor bus. In some examples, the processor bus can be implemented using Peripheral Component Interconnect (PCI) and/or a variation of the PCI bus protocol, such as PCI Express (PCIe). The processor bus can connect the processor 100 to I/O devices 132 such as, for example, input and output devices, memory controllers, storage devices, and/or network interface cards, among other things. In some examples, the I/O controllers 144a-144p can enable the processor 100 to act as an I/O device for a host processor. In the illustrated example, the processor 100 includes p I/O controllers 144a-144p, each of which may include a separate root complex and may communicate with a separate set of I/O devices 132. In other examples, other standardized bus protocols, such as Ultra Path Interconnect (UPI) can be used for the host bus. In other examples, a proprietary bus protocol can be used.

The example processor 100 further includes DMA engines 146a-146d that can move data between the accelerators 102a-102n, DRAM controllers 142a-142k, and I/O controllers 144a-144p. In the illustrated example, the processor 100 includes d DMA engines 146a-146d. In some implementations, the DMA engines 146a-146d can be assigned to specific tasks, such as moving data from the DRAM controllers 142a-142k to the accelerators 102a-102n, or moving data between the I/O controllers 144a-144p and the accelerators 102a-102n. In some implementations, at least one DMA engine 146a-146d can be dedicated to each accelerator 102a-102n, for moving data into and out of the accelerators 102a-102n. In some implementations, the DMA engines 146a-146d can be treated as a pool instead of being dedicated to a function or component, such that whenever data needs to be moved, an available DMA engine 146a-146d is engaged.

In the example processor 100, the various components can communicate over a communication fabric 120. The communication fabric 120 primarily includes wiring for routing data between the components of the processor 100. In some cases, the communication fabric 120 can include a minimal amount of logic, such as multiplexors to control the direction of data, flip-flops for handling clock domain crossings, and timing logic.

The communication fabric 120 can, for example, include a number of master ports 122a-122c and target ports 124a-124c. A master port can drive transactions onto the communication fabric 120. Thus, for example, each of the DRAM controllers 142a-142k, the I/O controllers 144a-144p, I/O controllers 144a-144p, and/or accelerators 102a-102n can include an individual master port. For clarity, only the master ports 122a-122c of the DRAM controllers 142a-142k are illustrated. A target port can receive transactions. Target ports can also be referred to as slave ports. Each of the DRAM controllers 142a-142k, the I/O controllers 144a-144p, I/O controllers 144a-144p, and/or accelerators 102a-102n can include a target port. For the sake of clarity, only the target ports 124a-124c of the accelerators 102a-102n are illustrated. A component on the communication fabric 120 need not have a master port if the component will not generate read or write transactions to other components, and need not have a target port if the component will not receive read or write transactions. Communications between master ports and target ports are unidirectional, in that address and data signals can only be driven by a master port, and transaction response signals can only be driven by a target port.

In the example of FIG. 1, the communication fabric 120 uses a point-to-point bus protocol. In a point-to-point system, each of the master ports 122a-122c has a separate and exclusive connection to each of the target ports 124a-124c. In this context, exclusive means that a master port can only use a connection to communicate with one target port. The master port thus has a different connection (e.g., a set of wires) with each target port with which the master port communicates (which can be a subset of all the target ports on the communication fabric 120). The connection can be described as a bus or channel. Examples of communication protocols that are point-to-point include AXI and PCIe. Examples of communication protocols that are not point-to-point, in which a master can communicate with multiple different targets on the same bus, include Advanced High-performance Bus (AHB) and the original PCI standard.

In various examples, the bus protocol implemented by the communication fabric 120 may not include the ability to multicast from one master port to multiple target ports. Multicast, in this context, means that a transaction requester (e.g., a DRAM controller 142a) can place one transaction request with its master port 122a, and the one request results in multiple transactions to different target ports. The AXI specification, for example, does not include multicast as a function of master ports. Lacking this ability, the DRAM controller 142a would have to place a request for each target port to which the DRAM controller 142a is to send a transaction. When these requests are, for example, to write data to an accelerator, each request can include reading, from the DRAM 130, the data to be written.

In some examples, each of the accelerators 102a-102n can simultaneously be executing a different program. In some examples, two or more of the accelerators 102a-102n can be execute the same program for different inputs. In some examples, two or more of the accelerators 102a-102n can be executing parts of the same program (e.g., a first accelerator 102a executes the first half, and a second accelerator 102b executes the second half).

When two or more of the accelerators 102a-102n are executing the same program, loading of the program into the accelerators 102a-102n can mean that one or more DRAM controllers are reading, then writing, the same data repeatedly, once for the each accelerator being loaded. The DRAM controllers can thus be competing for limited bandwidth, such that the loading of the accelerators 102a-102n can take far longer than the time required for each accelerator to operate on the data.

In various implementations, the master ports 122a-122c can be modified to add multicasting capability, so that the program for the accelerators 102a-102n can be read once and then be written to each accelerator that is to execute the program. The master ports 122a-122c can be configured with the address ranges of various targets on the communication fabric 120. Targets can include components such as the DRAM controllers 142a-142k, the DMA Engines 146a-146d, the I/O controllers 144a-144p, and the accelerators 102a-102n. Targets can also include memories or memory banks within these components. For example, as discussed further below, the accelerators 102a-102n can each include a memory subsystem that includes multiple banks. When a master port receives a transaction request, the master port can use the address ranges to identify a target for the request. The master port can then generate a transaction for that target on the connection to the target's target port. The address ranges can, for example, be stored in a memory or in configuration registers of the master ports 122a-122c. Being configurable with address ranges of various targets can be a requirement for the master ports 122a-122c to be compliant with a bus standard, such as AXI.

In various examples, the master ports 122a-122c can modified to be configurable with multicast address ranges. A multicast address range can include more than one target. For example, a multicast address range can include a first accelerator 102a and a second accelerator 102b. In this example, when a master port receives a request that includes an address that falls within the multicast address range, the master port can generate a transaction to each of the first accelerator 102a and the second accelerator 102b. The master port can still include individual address range definitions for each of the first accelerator 102a and second accelerator 102b, and transaction requests whose addresses fall within either of these address ranges will generate only one transaction for the appropriate accelerator.

In various examples, the master ports can be configured with multiple multicast address ranges, where each multicast address range maps to different targets. For example, one multicast address range can include the first accelerator 102a and second accelerator 102b, another multicast address range can include the second accelerator 102b and a third accelerator 102n, and third multicast address range can include all three accelerators 102a-102n. Having these and other multicast address ranges can enable a master port to, for example, send the same data to different accelerators.

As another example, a multicast address range can be defined that maps to two or more memory banks of one accelerator. In this example, a master port can send multiple transactions to one accelerator in order to, for example, write the same data to multiple memory banks of the accelerator. Placing multiple copies of the data in the accelerator can enable the accelerator to be used more efficiently. For example, when the accelerator includes a computational array, the multiple copies can be input into different rows of the array, thereby increasing the utilization of the computational array.

Figure 2:
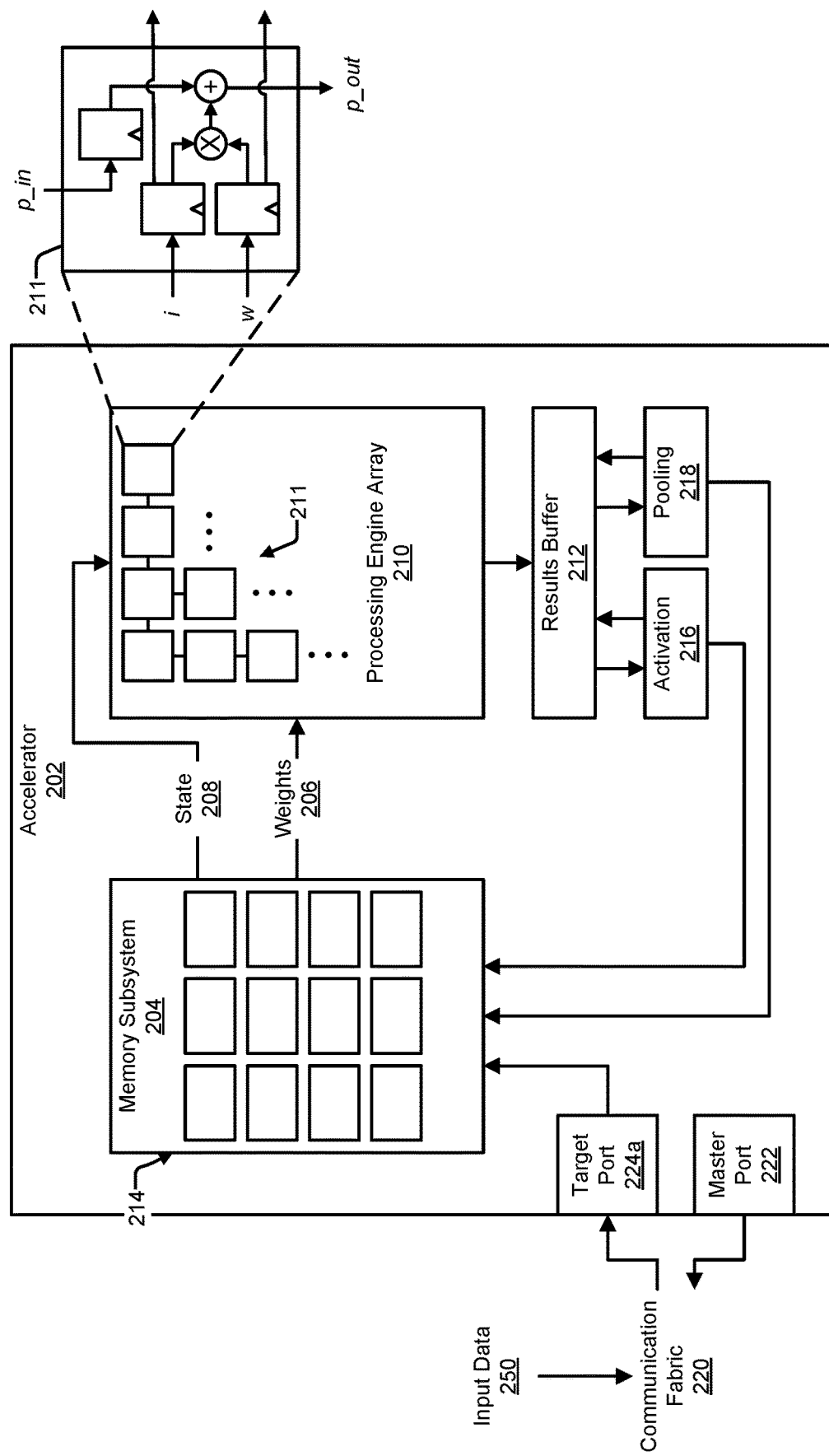
FIG. 2 includes a block diagram that illustrates an example of an accelerator.

FIG. 2 includes a block diagram that illustrates an example of an accelerator 202. The accelerator 202 can be included in a processor, such as the processor illustrated in FIG. 1. In some examples, the accelerator 202 can implement a neural network processing engine. In these examples, the accelerator 202, for a set of input data 250, can execute a neural network to perform a task for which the neural network was trained. Executing a neural network on a set of input data can be referred to as inference or performing inference. In various implementations, the example accelerator 202 is an integrated circuit component of a processor. The processor can have other integrated circuit components, including additional neural network processing engines.

In various implementations, the accelerator 202 can include a memory subsystem 204 and a computational array, which can also be referred to as a processing engine array 210. When in operation (e.g., when computing a result for a set of input data 250), the processing engine array 210 can read weight 206 and state 208 values from the memory subsystem 204. The processing engine array 210 can output computation results to a results buffer 212. In some cases, the example accelerator 202 can perform an activation function (using an activation 216 block) and/or pooling (using a pooling 218 block) on the results from the processing engine array 210, before the results are written to the memory subsystem 204.

Weights 206, in this example, are the weight values for a neural network. In various examples, the weights 206 are post-training weights, meaning that values for the weights 206 were previously determined. State 208, in this example, can include input data 250 when a computation begins, as well as intermediate values that reflect an in-progress computation. State 208, for example, can include partial sums determined by the processing engine array 210. State 208 can also include instructions for the processing engine array 210, where the instructions may be associated with a particular layer. The instructions can, for example, instruct the processing engine array 210, and possibly also the activation 216 and/or pooling 218 blocks, to execute a certain computation. The weights 206 and the state 208 can be read from the memory subsystem 204 for operating on by the processing engine array 210. In some examples, the memory subsystem can also include a separate memory or buffer for instructions.

In various implementations, the memory subsystem 204 can include multiple memory banks 214. In these implementations, each memory bank 214 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 214. For example, each memory bank can have at least one read channel and may have at least one separate write channel that can be used at the same time. In these examples, the memory subsystem 204 can permit simultaneous access to the read or write channels of multiple memory banks. As another example, the memory subsystem 204 can include arbitration logic such that arbitration between, for example, the outputs of multiple memory banks 214 can result in more than one memory bank's output being used. In these and other examples, though globally managed by the memory subsystem 204, each memory bank can be operated independently of any other.

Having the memory banks 214 be independently accessible can increase the efficiency of the accelerator 202. For example, weights 206 and state 208 can be simultaneously read and provided to each row of the processing engine array 210, so that the entire processing engine array 210 can be in use in one clock cycle. As another example, weights 206 and state 208 can be read at the same time that intermediate results are written to the memory subsystem 204. In contrast, a single memory, while still able to provide weights 206 and state 208 to the processing engine array 210 faster than off-chip memory, may be able to service only one read or write at a time. With a single memory, multiple clock cycles can be required, for example, to read weights for each row of the processing engine array 210 before the processing engine array 210 can be started.

In various implementations, the memory subsystem 204 can be configured to simultaneously service multiple clients, including the processing engine array 210, the activation 216 block, the pooling 218 block, and any external clients that access the memory subsystem 204 over a communication fabric 220. In some implementations, being able to service multiple clients can mean that the memory subsystem 204 has at least as many memory banks as there are clients. In some cases, each row of the processing engine array 210 can count as a separate client. In these cases, weights 206 and state 208 can be stored separately, and thus require pairs of reads, or can be concatenated and stored together, thus requiring one read. In some cases, each column of the processing engine array 210 can output an intermediate value, such that each column can count as a separate write client. In some cases, output from the processing engine array 210 can be written into the memory banks 214 that can then subsequently provide input data for the processing engine array 210. The memory banks 214 can be implemented, for example, using static random access memory (SRAM).

In various implementations, the memory subsystem 204 can include control logic. The control logic can, for example, keep track of the address spaces of each of the memory banks 214, identify memory banks 214 to read from or write to, and/or move data between memory banks 214, if needed. In some implementations, the memory subsystem 204 can include multiplexors for selecting which memory bank to output to a particular client and/or to receive input from a particular client. In these implementations, the control logic can generate select signals for the multiplexors, which can enable some or all of the memory banks 214 to service each client. In some implementations, memory banks 214 can be hardwired to particular clients. For example, a set of memory banks 214 can be hardwired to provide weights 206 and state 208 to the rows of the processing engine array 210. In these examples, the control logic can move data between memory banks 214, for example, to move intermediate results from the memory banks 214 to which the intermediate results are written, to the memory banks 214 from which the intermediate results will be read for the next round of computation.

The processing engine array 210 is the computation matrix of the accelerator 202. The processing engine array 210 can, for example, execute parallel integration, convolution, correlation, and/or matrix multiplication, among other things. The processing engine array 210 includes multiple processing engines 211, arranged in rows and columns, such that results output by one processing engine 211 can be input directly into another processing engine 211. Processing engines 211 that are not on the outside edges of the processing engine array 210 thus can receive data to operate on from other processing engines 211, rather than from the memory subsystem 204.

In various examples, the processing engine array 210 uses systolic execution, in which data arrives at each processing engine 211 from different directions at regular intervals. In some examples, input data can flow into the processing engine array 210 from the left and weight values can be loaded at the top. In some examples weights and input data can flow from the left and partial sums can flow from top to bottom. In these and other examples, a multiply-and-accumulate operation moves through the processing engine array 210 as a diagonal wave front, with data moving to the right and down across the array. Control signals can be input at the left at the same time as weights 206, and can flow across and down along with the computation.

In various implementations, the number of columns in the processing engine array 210 determines the computational capacity of the processing engine array 210, and the number of rows determines the required memory bandwidth for achieving maximum utilization of the processing engine array 210. The processing engine array 210 can have, for example, 64 columns and 428 rows, or some other number of columns and rows.

An example of a processing engine 211 is illustrated in FIG. 2 in an inset diagram. As illustrated by this example, a processing engine 211 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 211.

In the illustrated example, an input from above can include a partial sum, pin, provided either from another processing engine 211 or from a previous round of computation by the processing engine array 210. When starting a computation for a new set of input data, the top row of the processing engine array 210 can receive a fixed value for p_in, such as zero. As illustrated by this example, i and w are multiplied together and the result is summed with p_in to produce a new partial sum, p_out, which can be input into another processing engine 211. Various other implementations of the processing engine 211 are possible.

Outputs from the last row in the processing engine array 210 can be temporarily stored in the results buffer 212. The results can be intermediate results, which can be written to the memory banks 214 to be provided to the processing engine array 210 for additional computation. Alternatively, the results can be final results, which, once written to the memory banks 214 can be read from the memory subsystem 204 over the communication fabric 220, to be output by the system.

In some implementations, the accelerator 202 includes an activation 216 block. In these implementations, the activation 216 block can combine the results from the processing engine array 210 into one or more output activations. For example, for a convolutional neural network, convolutions from multiple channels can be summed to produce an output activation for a single channel. In other examples, accumulating results from one or more columns in the processing engine array 210 may be needed to produce an output activation for a single node in the neural network. In some examples, activation 216 block can be bypassed.

In some implementations, the accelerator 202 can include a pooling 218 block. Pooling is the combining of outputs of a cluster of nodes from a layer of a neural network. The combined output can be provided to the next layer. Combining can include for example, computing a maximum value, a minimum value, an average value, a median value, or some other value determined from the outputs of the cluster of nodes. In various examples, the pooling 218 can be selectively activated, as needed for any particular neural network.

Input data 250 can arrive over the communication fabric 220. The communication fabric 220 can connect the accelerator 202 to other components of a processor, such as a Direct Memory Access (DMA) engine that can obtain input data 250 from an Input/Output (I/O) device, a storage drive, or a network interface. The input data 250 can be, for example one-dimensional data, such as a character string or numerical sequence, or two-dimensional data, such as an array of pixel values for an image or frequency and amplitude values over time for an audio signal. In some examples, the input data 250 can be three-dimensional, as may be the case with, for example, the situational information used by a self-driving car. In some implementations, the memory subsystem 204 can include a separate buffer for the input data 250. In some implementations, the input data 250 can be stored in the memory banks 214 along with the weights 206.

To communicate with the communication fabric 220, in various examples, the accelerator 202 can include a master port 222 and a target port 224. The accelerator 202 can use the master port 222 to drive transactions onto the communication fabric 220. For example, the accelerator 202 can generate a write transaction that indicates that the accelerator 202 has completed a computation. In this example, the write transaction can be addressed to, for example, a host processor or a management device for the accelerator 202. The accelerator 202 can use the target port 224 to receive transactions, such as, for example, write transactions that write weights 206 into the memory subsystem 204 and write transactions that write the input data 250 into the memory subsystem 204, among others.

In various implementations, the weights 206 stored in the memory subsystem 204 can have been determined by training the neural network to perform one or more tasks. The input data 250 can include an instruction indicating the task to perform (e.g., image processing, speech recognition, machine translation, etc.). In various implementations, the accelerator 202 is configured for conducting inference (e.g., performing a task), rather than for training of the neural network. In some implementations, the accelerator 202 can be used for training, possibly with assistance from software to update the stored weights 206.

In various implementations, the memory subsystem 204 can include enough memory to store both intermediate results and all of the weight values for a neural network. The memory subsystem 204 should have, at a minimum, enough memory in the memory subsystem 204 to store intermediate results, but in many cases the memory subsystem 204 can include many more memory banks 214 than are needed to store just intermediate results. This additional space can be used to store some or all of the weight values for a neural network before the accelerator 202 is instructed to perform inference. For example, a neural network may have 1.5 million weights, which, when each is represented by 32 bits, can require about 6 MB of memory. Intermediate results can require, for example, 10 MB of storage space, at most. On-chip memory of 20 MB is a reasonable size, and, in the preceding example, can readily accommodate the weight values, intermediate results, and any other data that the accelerator 202 can need during operation.

Utilization of the processing engine array 210 can approximate utilization of the accelerator 202, thus it is desirable for as much of the processing engine array 210 to be performing computations at the same time. When operating on a first layer of a neural network, however, the entire processing engine array 210 may be under-utilized. For example, the input data 250 for a neural network can include up to three input feature maps, with each input feature map representing a different channel (e.g., a red, green, and blue channel when the input data 250 is an image). In this example, a filter can be applied to each of the input feature maps, and to do so, each input feature map can be input into a different row of the processing engine array 210. In this example, only three rows of the processing engine array 210 are used to operate on the first layer, with the rest being idle. For subsequent layers of the neural network, this may not be the case, as the layers of a convolutional network tend to multiply the number of feature maps. But the low utilization of the processing engine array 210 for the first layer can cause a cumulative reduction in the overall utilization of the processing engine array 210 over the course of many inferences.

One technique for improving the utilization of the processing engine array 210 for the first layer of a neural network is to an input feature map to be input into multiple rows, with a different filter element being applied in each row. For example, a first filter element can be applied to an input feature map in row 0, and a second element form the same filter can be applied to the same input feature map in row 3. In this and other examples, it may be that the same filter element is not applied to the input feature map in the same way. For example, the first filter element may need to be applied to the first three elements of the input feature map, while the second filter element may need to be applied to the second, third, and fourth elements of the input feature map. In this example, the first copy of the input feature map may need to be input into the processing engine array 210 starting at the first element, while the second copy may need to be input into the processing engine array 210 starting at the second element.

To enable copies of the same data to be input in this staggered manner, an accelerator can include hardware for reading the data at staggered offsets. In this example, the data can be written into different many more memory banks 214 at a same address offset. For example, when a first bank includes hexadecimal addresses 0x0000 through 0x000F and a third bank includes address 0x0030 through 0x003F, the data can be written to addresses 0x0000 and 0x0030 in these banks. Additionally, in this example, the hardware can start reading the first bank at address 0x0000 and the third bank at address 0x0031 to skip the first data word. But having hardware that is able to determine, for each bank, the address at which to start reading may require an undesirable amount of complexity in the implementation of the accelerator 202.

An alternative is to have the data be written into the memory banks of the accelerator in a staggered layout. To do so, in various examples, the target port 224 can be modified so that, when the target port 224 receives a transaction whose address is within a particular address range, the target ports 224 can modify the address to add an offset. The offset can shift the data from a location indicated by the address, such that different data words from the data fall at the same address offset. For example, using the example address ranges in the previous example, in the first bank the first element of the data can fall at address 0x0000, and in the third bank the second element can at address 0x0030. In this example, the accelerator 202 can read different banks at the same address offset, and the memory subsystem 204 will output the data in a staggered manner.

In various examples, the target port 224 can be configured to include multiple multicast address ranges, where a multicast address range can be associated with a set of banks in the memory subsystem 204. For example, the banks can each be identified by an index, and a multicast address range can be associated with a set of indices. The indices can indicate to which banks transactions whose address fall within the multicast address range apply.

The indices can also be used to indicate by how much data should be offset in a bank, but to provide more flexibility in this regard, a transaction can specify an offset value, where the offset value can indicate the amount by which the data should be shifted. For example, the offset value can indicate that the data is to be shifted by one word for each bank into which the data is copied, so that a first bank receives the data shifted by no data words, a second bank receives the data shifted by one data word, a third bank receives the data shifted by two data words, and so on.

In various examples, the offset value can be generated by the master port from which a write transaction originates. The master port can, for example, by configured with a multicast address range that corresponds to a set of banks in the accelerator 202. The address range can further be associated with an offset value, which the master port can send with transactions whose addresses fall in the multicast address range. Alternatively or additionally, a component that places requests with the master port can supply an offset value. When the target port 224 receives the transaction, the target port 224 can modify the transactions address by combining an index value with the offset value (for example, by multiplying the index with the offset value), and adding a result to the address. The target port 224 can then use the modified address to write the data to the memory subsystem 204.

When the target port 224 receives a transaction whose address does not fall within a multicast address range, the target port 224 can read data from or write data to the memory subsystem 204 without modifying the address.

Modifying the target port 224 to be able to modify the address of a transaction can enable duplicated data to be written to the memory subsystem 204 in a staggered fashion, which can make better use of the processing engine array 210.

Figure 3A:
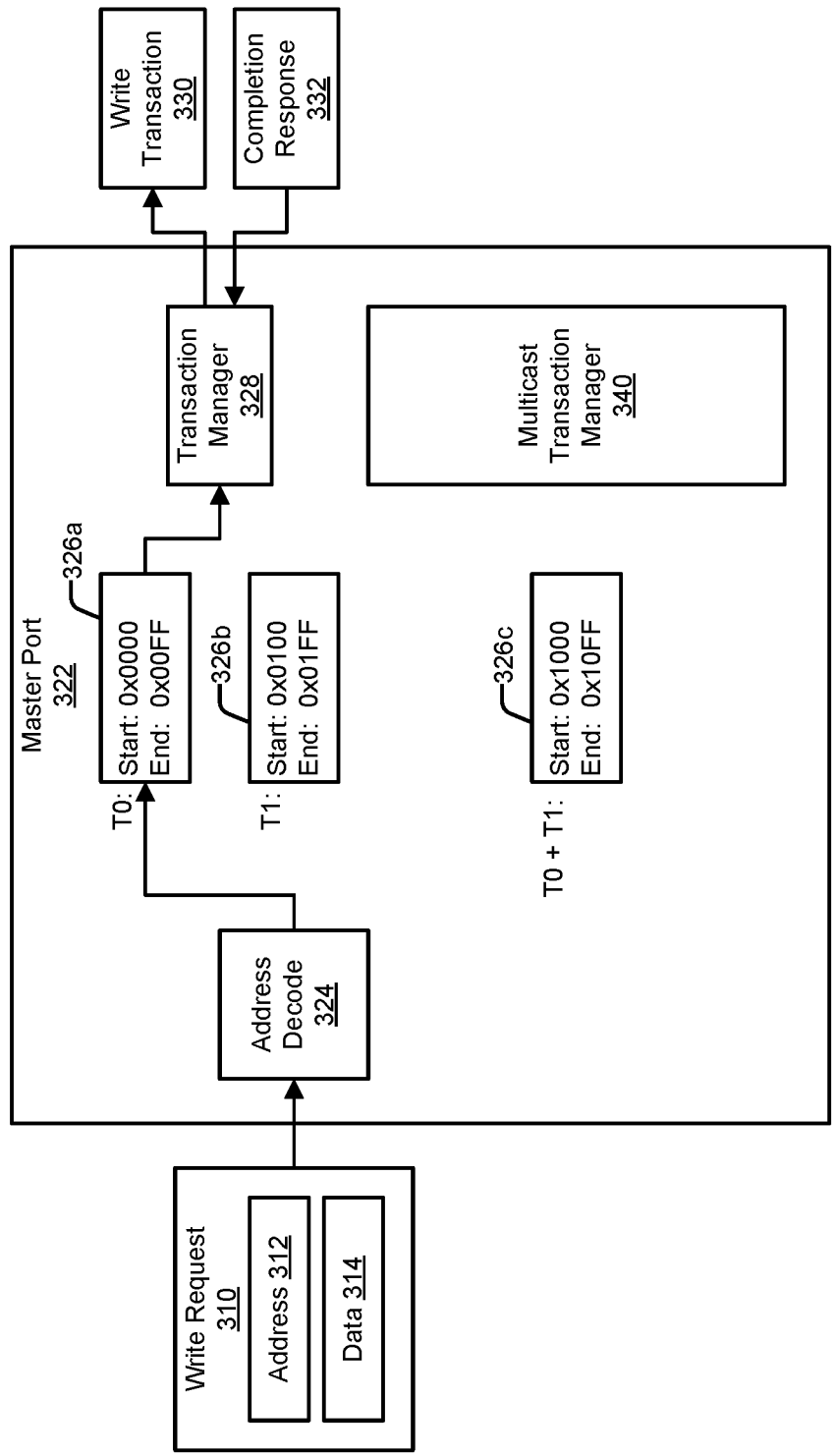
FIGS. 3A-3B include a block diagram of an example master port.
Figure 3B:
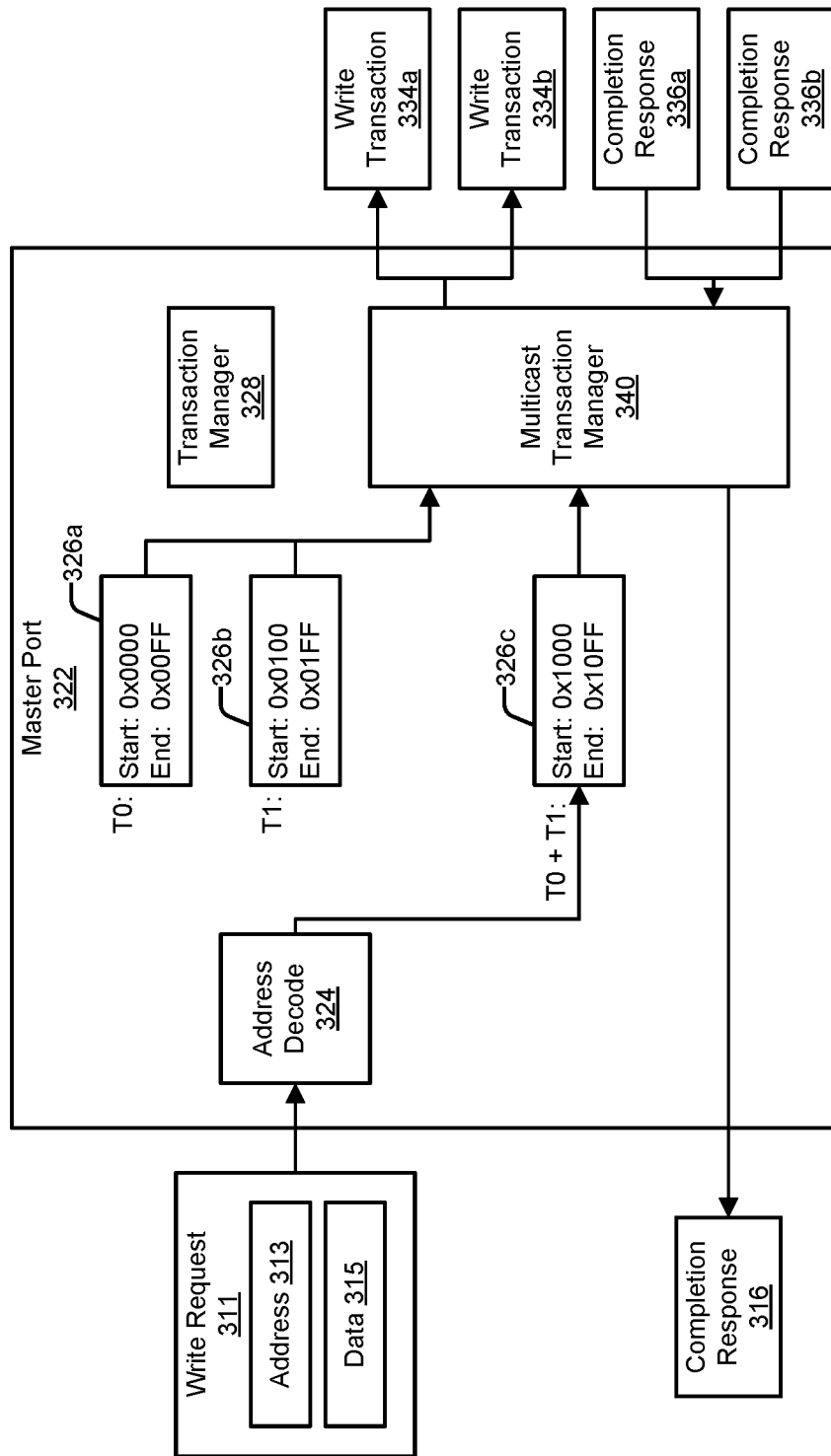

FIGS. 3A-3B include a block diagram of an example master port 322. The master port 322 can be an integrated circuit component of a larger integrated circuit device. For example, the master port 322 can be included in a processor, such as the processor illustrated in FIG. 1. The processor can further include multiple master ports that are similar to the master port 322 illustrated in FIGS. 3A-3B.

In various examples, the master port 322 can be based on a standard design for such components. As such, the master port 322 can include an address decode 324 unit, a transaction manager 328, and can be configured with a number of address ranges 326a-326c, a first address range 326a for a first target ("T0") and a second address range 326b for a second target ("T1"). T0 and T1 can be different components, such as different accelerators, or can be memory locations in the same component. The master port 322 can be configured with additional address ranges for additional targets. The master port 322 can also include other components that are not illustrated here.

The address decode 324 unit can examine incoming transaction requests, and, using the address ranges 326a-326c, determine the target for the requests. The first address range 326a and the second address range 326b of this example can each define the set of addresses that a target can accept. In this example, these address ranges are specified using a start address and an end address. In other examples, the address ranges can be specified in another manner, such as using a base address and a length, for example. The first address range 326a and the second address range 326b can be stored in the master port 322 in a set of registers or in memory, for example.

In various examples, the first address range 326a and second address range 326b can be used to send transactions to T0 and T1, respectively. For example, in FIG. 3A, the master port 322 receives a write request 310 that includes an address 312 and data 314. In this example, the address decode 324 can determine that the address 312 falls with the first address range 326a, and thus that the data 314 should be sent to T0. The master port 322 can then activate the transaction manager 328 to generate a write transaction 330 that includes the address 312 and the data 314. The transaction manager 328 can further receive a completion response 332 from T0 that indicates whether the write transaction 330 was successful. A similar set of operations can occur when the master port 322 receives a write request for T1 or when the master port 322 receives a read request.

The example master port 322 has further been modified to include a multicast address range 326c and a multicast transaction manager 340. In the example of FIGS. 3A-3B, the multicast address range 326c is associated with both T0 and T1. The master port 322 can be configured with additional multicast address ranges that are associated with the same or with different targets.

When the master port 322 receives a request with an address that falls within the multicast address range 326c, the master port 322 can generate a transaction for each of T0 and T1. For example, in FIG. 3B, the master port 322 receives a write request 311 that includes an address 313 and data 315. In this example, the address decode 324 determines that the address 313 is within the multicast address range 326c. The master port 322 can thus activate the multicast transaction manager 340, which can generate a first write transaction 334a to T0 and a second write transaction 334b to T1.

In some examples, the multicast transaction manager 340 can use the first address range 326a and the second address range 326b to determine addresses for the first write transaction 334a and the second write transaction 334b. For example, when the address 313 is hexadecimal 0x1004, the multicast transaction manager 340 can determine that the address for the first write transaction 334a is 0x0004 and the address for the second write transaction 334b is 0x0104. In this example, target ports at T0 and T1 can accept the write transactions 334a-334b the same way that the target ports receive non-multicast transactions. In other examples, the multicast transaction manager 340 can send the write transactions 334a-334b with the address 313 that came with the write request 311, and the target ports can handle the address 313 in the same way as an address that falls within the unicast address ranges 326a-362b, or can handle the address 313 differently.

In various examples, the multicast transaction manager 340 can also receive a first completion response 336a from T0 and a second completion response 336b from T1. In various examples, a bus protocol implemented by the master port 322 can call for the master port 322 to output a single completion response 316 for the write request 311. In these examples, the multicast transaction manager 340 can accumulate the completion responses 336a-336b, and determine a single completion response 316. When, for example, both completion responses 336a-336b indicate success, then the completion response 316 can also indicate successful completion. When at least one of the completion responses 336a-336b does not indicate success, or, after a timeout period, the multicast transaction manager 340 does not receive on or the other of the completion responses 336a-336b, the completion response 316 can indicate that the write request 311 was not completed successfully.

In various examples, multicast read transactions can be handled in a similar manner. With multicast read transactions, the multicast transaction manager 340 can concatenate, into the completion response, the data that is read, or can combine the data using, for example, an arithmetic or logical operation.

Figure 4A:
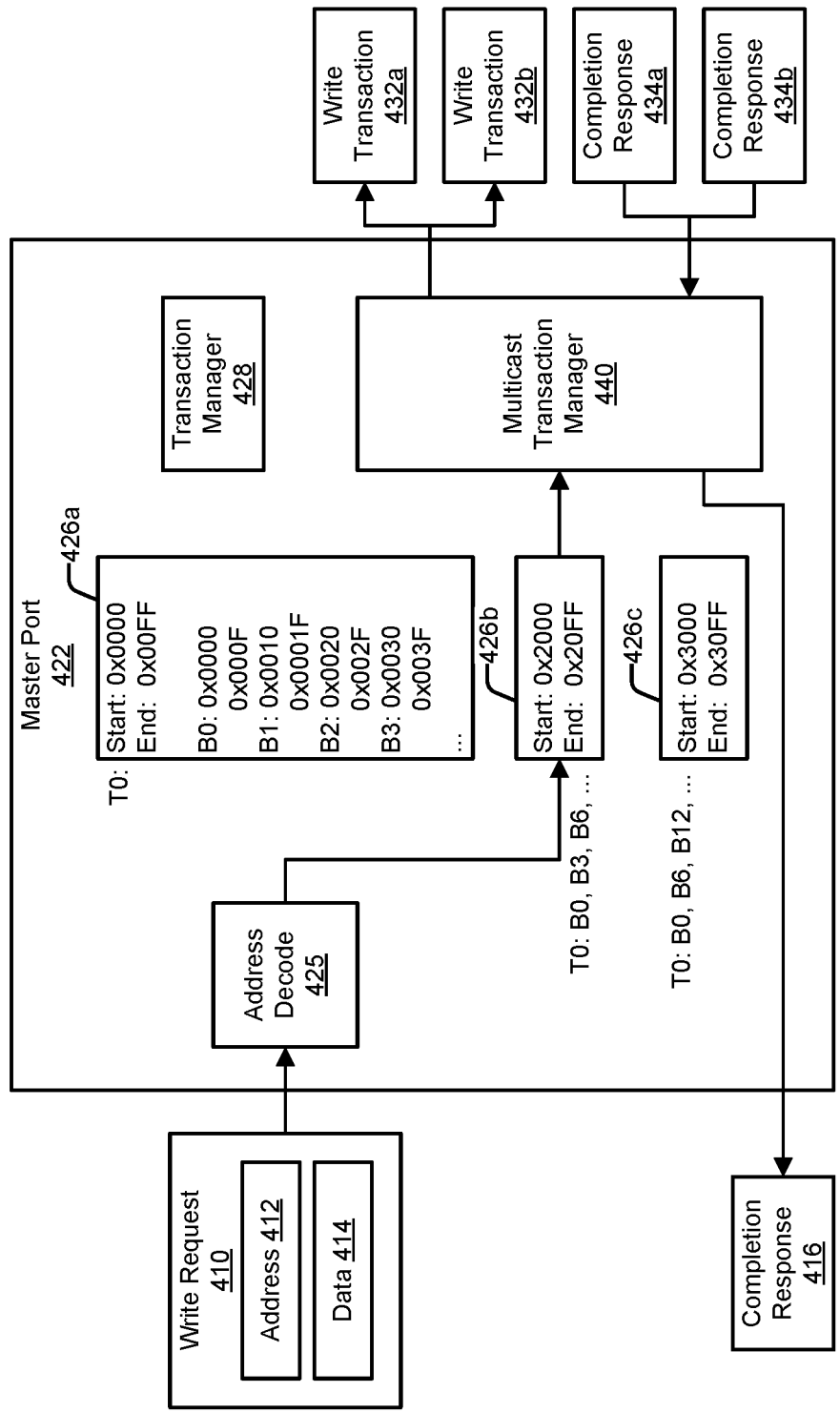
FIG. 4A includes a block diagram that illustrates an example master port.

The multicast capability of a master port can also be used to multicast to multiple memory locations in a single component. In conjunction with a modified target port, the multicasting can also be used to stagger the data across the memory locations. FIG. 4A includes a block diagram that illustrates an example master port 422 that can multicast to multiple targets, and FIG. 4B includes a block diagram that illustrates an example target port 424 that can distribute transactions across memory banks of a target component. The example master port 422 and target port 424 of FIGS. 4A-4B can be integrated circuit components of a larger integrated circuit device. For example, the master port 422 and the target port 424 can be included in a processor, such as the processor illustrated in FIG. 1. The processor can further include multiple master ports and target ports that are similar to the master port 422 and target port 424 illustrated in FIGS. 4A-4B.

In various examples, the master port 422 can be configured with a number of unicast addresses ranges. For example, the master port 422 can be configured with an address range 426a for a first target component ("T0"). T0 can be, for example, an accelerator. When the master port 422 receives a request, the master port 422 can use an address decode 425 unit to determine that an address for the request falls in the address range 426a. The master port 422 can then use a transaction manager 428 to generate a single transaction to the T0. In various examples, the transaction manager 428 can also receive any responses from T0 to the transaction.

In various examples, the master port 422 can be modified so that the master port 422 can also be configured with multicast address ranges. For example, in the example of FIG. 4A, the master port 422 has been configured with first multicast address range 426b and a second multicast address range 426c, both of which correspond to addresses at T0. In this case, the multicast address ranges 426b-426c map to different banks in the memory of T0. The first multicast address range 426b, for example, maps to banks numbered 0, 3, 6, and possibly others, and the second multicast address range 426c maps to banks numbered 0, 6, 12, and possibly others. As illustrated by this example, the multicast address ranges 426b-426c enable the memory banks of T0 to be loaded in different ways, with the loading arrangement being selectable, for example, by software that is configuring T0.

The multicast address ranges can enable the master port 422 to send multiple transactions from one transaction request. For example, in FIG. 4A, the master port 422 receives a write request 410 that includes an address 412 and data 414. In this example, the address decode 425 unit can determine that the address 412 is within the first multicast address range 426b. As a result of this determination, the master port 422 can cause the multicast transaction manager 440 to activate to send multiple write transactions 432a-432b each addressed to T0.

To determine addresses for the write transactions 432a-432b, the master port 422 can use several different techniques. For example, in addition to or instead of having one address range 426a configured for T0, the master port 422 can be configured with the address ranges of the individual memory banks of T0. In these examples, the multicast transaction manager 440 can use to address ranges of the memory banks to determine addresses to send with the write transactions 432a-432b, such that the transactions have addresses that are within address range 426a of T0. For example, according to the address ranges illustrated in FIG. 4A, when the address 412 received with the write request 410 is 0x2004, the multicast transaction manager 440 can determine to send the first write transaction 432a with the address 0x0004 and the second write transaction 432b with the address 0x0034, so that the first write transaction 432a will write the data 414 into bank 0 and the second write transaction 432b will write the data 414 into bank 3, respectively. In these and other examples, the target port at T0 can accept and handle these transactions the same as if the transactions were unicast transactions.

Alternatively or additionally, instead of mapping the address into the unicast address range 426a, the multicast transaction manager 440 can instead determine addresses within, for example, the first multicast address range 426b, so that the target port 424 can identify the write transactions 432a-432b as being multicast. In these examples, the multicast transaction manager 440 can determine addresses in the first multicast address range 426b that correspond to addresses in the unicast address range 426a. For example, when the address 412 is 0x2004, the multicast transaction manager 440 can determine to send the first write transaction 432a with address 0x2004 for bank and the second write transaction 432b with the address 0x2034 for bank 3.

Alternatively or additionally, instead of determining different transaction addresses for the write transactions 432a-432b, in some examples, the multicast transaction manager 440 can send the same address with each of the write transactions 432a-432b. The address can be the address 412 received with the request 410 or an address in the first memory bank associated with the multicast address range, for example. In these examples, the target port 424 can determine the memory bank to which the transaction data is to be written, as discussed further below.

In various examples, the multicast transaction manager 440 can further receive completion responses 434a-424b from T0, and generate a single completion response 416 for the write request 410. The completion response 416 can indicate successful completion of the write request 410 when each of the completion responses 434a-434b indicate success, and failure when at least one of the completion responses 434a-434b indicates an error, or at least one was not received after a timeout period.

In various examples, the multicast address ranges 426b-426c can also be used to enable the target port 424 to write the data 414 into the memory banks in a staggered layout. For example, the first multicast address range 426b can be assigned a stagger factor of one, such that write transactions generated for this address range result in the data being shifted by one data word for each transaction (e.g., the first write shifts the data by zero data words, the second by one data word, the third by two data words, etc.). As a further example, the second multicast address range 426c can be assigned a stagger factor of two, indicating a shift of two data words. In various examples, the stagger factor can be specified as a number of data words, as a number of bytes, or in some other manner, and can be included in the write transactions as an offset value. In various examples, to ensure that the master port 422 remains compatible with a bus protocol implemented by the master port 422, the offset value can be included in a field of the write transactions that has an unspecified use. For example, in the AXI standard, the "awuser" field can be used.

Figure 4B:
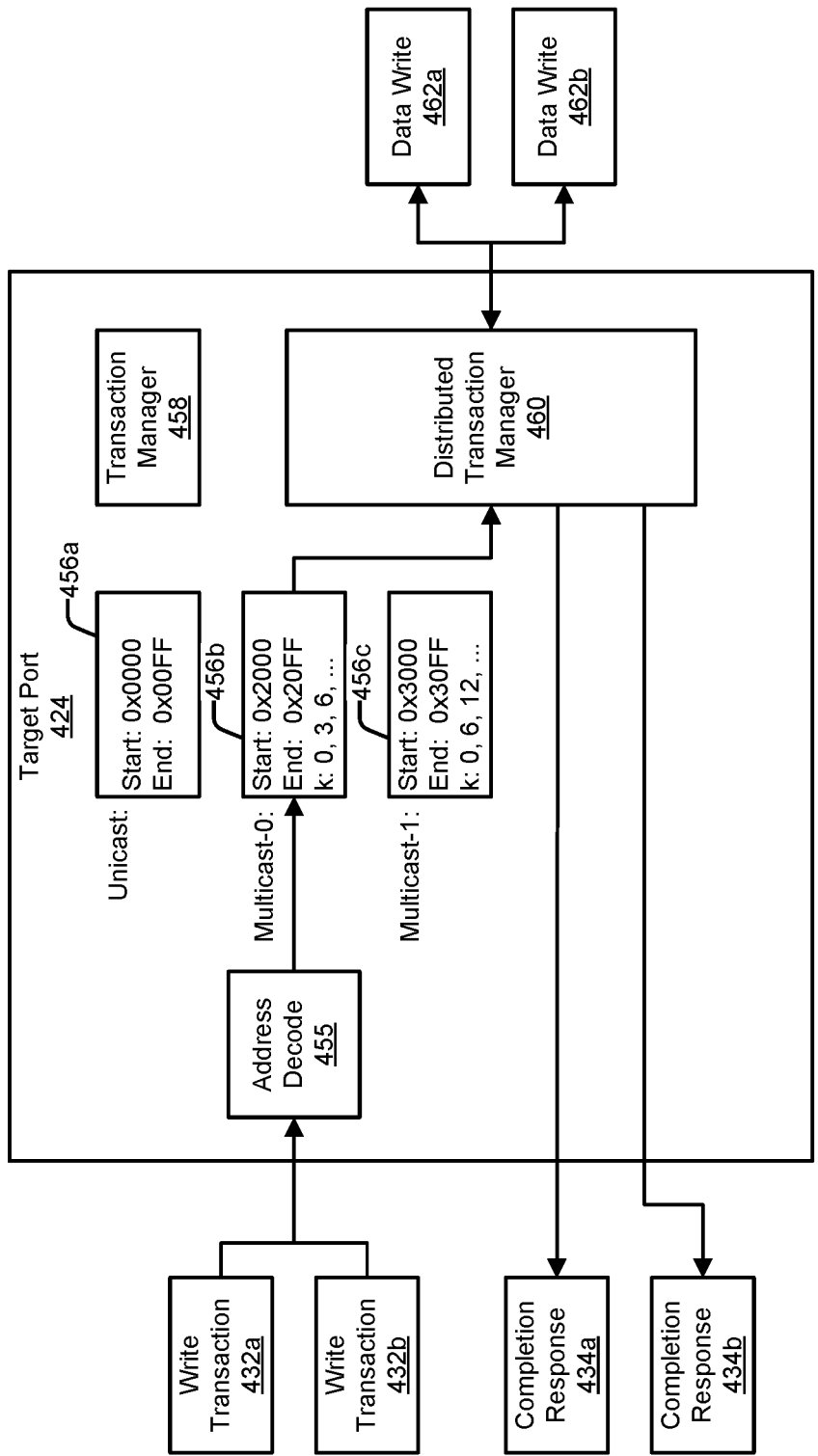
FIG. 4B includes a block diagram that illustrates an example target port.

FIG. 4B illustrates an example of a target port 424 for T0, which can distribute transactions among the memory banks of a target component. In various examples, the target port 424 can be configured with a unicast address range 456*a*, which identifies to the target port 424 the address space of the component for which the target port 424 is receiving transactions. In various examples, the target port 424 can use the address range 456*a* to determine whether transactions received by the target port 424 should be accepted or rejected. In a point-to-point communication fabric, the target port 424 should only receive transactions that fall within the address range 456*a*. thus, for example, when the target port 424 receives a transaction whose address is not within the address range 456*a*, the target port 424 can respond with an error. The target port 424 can include, for example, an address decode 455 unit that can determine whether a transaction has a valid address, and that can respond with an error when the address is not valid.

Similar to the master port 422, the example target port 424 is also configured with several multicast address ranges 456*b*-456*c*. The multicast address ranges 456*b*-456*c* can enable the target port 424 to accept transactions that are not within the unicast address range 456*a*. The multicast address ranges 456*b*-456*c* can also enable the target port 424 to identify transactions that are associated with more than one memory location, which are identified in the example of FIG. 4B by an index, k. For example, the first multicast address range 456*b* ("Multicast-0") is associated with memory banks identified by k=0, 3, 6, . . . and the second multicast address range 456*c* ("Multicast-1") is associated with memory banks identified by k=0, 6, 12, . . . . The distributed transaction manager 460 can include a distributed transaction manager 460 for managing transactions for the multicast address ranges 456*b*-456*c*, which can be separate from or integrated with a transaction manager 458 that manages all other transactions.

In various examples, the target port 424 can use the indices associated with multicast address ranges 456*b*-456*c* to determine an amount be which to shift data that is provided with write transactions that fall within these address ranges. In these examples, the write transactions can include an offset value, which can indicate a shift factor, and memory bank index k can determine the amount by which the data is to be shifted. For example, in FIG. 4B, the target port 424 receives a first write transaction 432*a* and a second write transaction 432*b* that both include addresses that are within the first multicast address range 456*b*, and that include the same data. In this example, the distributed transaction manager 460 can determine that the first multicast address range 456*b* is associated with index k=0, and from this information, can determine an offset amount. For example, the distributed transaction manager 460 can combine the index with the offset value provided by the first write transaction 432*a* (e.g., by multiplying the index by the offset value). The distributed transaction manager 460 an further add a result of the combining to the address of the first write transaction 432*a* to determine a new address. In some examples, the distributed transaction manager 460 may need to map the address of the first write transaction 432*a* from the first multicast address range 456*b* to the unicast address range 456*a* before determining the new address. The distributed transaction manager 460 can then use the new address in a first data write 462*a* to a memory location. Further in this example, the distributed transaction manager 460 can determine that the second write transaction 432*b* is associated with index k=3, and from this information can determine an address for a second data write 462*b* to the memory. In this example, each of the first data write 462*a* and the second data write 462*b* can result in the data from the transactions being shifted by a different amount from the addresses indicated in the write transactions 432*a*-432*b*. Examples of this staggering of the data across the memory banks are discussed further below.

In the preceding example, the distributed transaction manager 460 can determine the index for the write transactions 432*a*-432*b*, for example, by maintaining a count of transactions received for the first multicast address range 456*b*. Alternatively or additionally, the distributed transaction manager 460 can determine the index from the address of each of the write transactions 432*a*-432*b*, which can be specific to the memory bank being written by each. Alternatively or additionally, the distributed transaction manager 460 can determine the index from a field that is part of each of the write transactions 432*a*-432*b*.

In some examples, both of the write transactions 432*a*-432*b* in the example of FIG. 4 can include a same offset value. In these examples, the memory bank index can determine the amount by which the data is shifted in different memory banks. In some examples, the write transactions 432*a*-432*b* include different offset values, in which case the offset values in conjunction with the memory bank index can indicate the shift amount.

In various examples, the distributed transaction manager 460 can further determine whether the data writes 462*a*-462*b* completed successfully, and can output completion responses 434*a*-434*b* to each of the write transactions 432*a*-432*b*.

In some examples, instead of or in addition to the master port 422 generating multiple transactions to multicast a single request, the target port 424 can multicast a single transaction to multiple locations. For example, as illustrated in FIG. 4A, the master port 422 can be configured with two multicast address ranges 426*b*-426*c* that both correspond to addresses within T0. In this example, when the master port 422 receives a write request that falls within one of the multicast address ranges 426*b*-426*c*, instead of generating multiple write transactions, the master port 422 can instead send a single write transaction that includes an address from a multicast address range. Using the multicast address range can identify the transaction to the target port 424 as needing to be duplicated.

Continuing with the preceding example, when the target port 424 of FIG. 4B receives the one transaction, the target port 424 can determine, from the address being within a multicast address range, to perform multiple data writes 462*a*-462*b*. The number of data writes to perform and the addresses to use for the data writes can be determined from the indices associated with the multicast address ranges 426*b*-426*c*. For example, the index k=0 and k=3 can be used to identify the base address of bank 0 and of bank 3, respectively, as the starting point for determining the target address. For example, the distributed transaction manager 460 can include a mapping of indices to memory bank base addresses. Having the base address, the distributed transaction manager 460 can map the address of the write transaction to an address in a memory bank. The distributed transaction manager 460 can further generate a data write for each of the indices associated with a multicast address range.

The distributed transaction manager 460 can further determine, based on the success or failure of each data write, a single completion response to send bank to the master port 422.

In the preceding example, the target port 424 can also stagger the data with the data writes 462a-462b. In this example, a write transaction to an address in the multicast address ranges 456b-456c can include an offset value, and can the distributed transaction manager 460 can use the offset value and the bank index to determine the offset amount, as discussed above.

Figure 5:
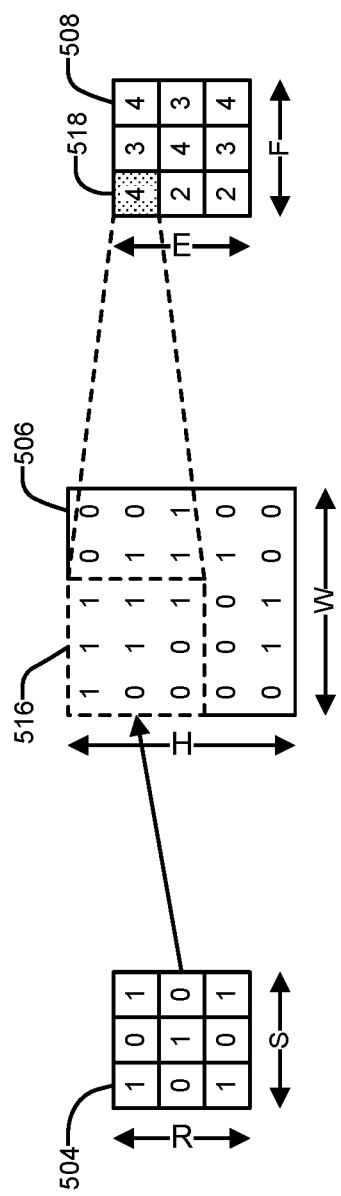
FIG. 5 illustrates graphically an example of a two-dimensional convolution.

FIG. 5 illustrates graphically an example of a two-dimensional convolution, an operation that can occur in a layer of a convolutional neural network. This example is being provided to illustrate the manner in which data can be duplicated into and offset when written into a memory, so that the data can be input into a computational array of an accelerator in a staggered order.

Convolutional neural networks are often used for tasks such as image recognition, speech recognition, machine translation, and other tasks. In the example of FIG. 5, an input feature map 506 includes some or all of the input data for an inference (e.g., the performance of the task). For example, the input feature map 506 can include the values of pixels from an image, with each index in the input feature map 506 storing an intensity of the color. As another example, the input feature map 506 can include letters and other symbols from a character string. In this example, the input feature map 506 is a two-dimensional representation of the input data. In other examples, the input data can be three-dimensional. For example, for a color input image, the input data can include three input feature maps, one each for the green, blue, and red channels of the input image. In the illustrated example, the input feature map 506 has a height H and a width W. With three-dimensional input data, a depth C can represent a count of the number of input feature maps. In some examples, the input data can be four-dimensional, such as when the input data includes virtual reality images. Virtual reality images can include, for example, six input feature maps, three for the red, green, and blue channels, multiplied by two for each eye.

A step in the operation of the neural network can involve application of a filter to the input feature map 506. In the example of FIG. 5, filter elements are arranged in a filter plane 504, a two-dimensional matrix of values having a height R and a width S. The values in the filter plane 504 can be selected to filter for particular features, such as lines, edges, curves, corners, blobs, ridges, and so on. The filter plane 504 can also be referred to as a kernel or a feature detector.

The convolution operation involves computing a value for each possible position of the filter plane 504 over the input feature map 506. This computation includes multiplying each element in the filter plane 504 by a corresponding value in the input feature map 506 and summing the result. For example, at a first position 516 of the input feature map 506, multiplying each value in the filter plane 504 by each corresponding value in the first position 516 results in a matrix {(1, 0, 1), (0, 1, 0), (0, 0, 1)}. In this example, the sum of the values in the matrix results in the value 4, which is placed in a corresponding first position 518 in an output feature map 508. A region of values from the input feature map 506 can be referred to as input activations. The result of the multiplication and summation can be referred to as an output activation. Additional indices in the output feature map 508 can be computed by sliding the filter plane 504 to a different position in the input feature map 506. For example, by sliding the filter plane 504 to the right by one position, and then right again by one position, the values 3 and 4, respectively, can be computed for the remainder of the top row of the output feature map 508. The second row of the output feature map 508 can be computed by returning the filter plane 504 to the first position 516, sliding the filter plane 504 down by one position, and again to the right.

The output feature map 508 represents a higher-level abstraction of the input feature map 506. The output feature map 508 can, for example, represent edges or textures found in the input feature map 506. In this example, the output feature map 508 has a height E and a width F, which is the same as the height R and width S of the filter plane 504. In other examples, E and F can be less than R and S, such as when the filter plane 504 is moved, between calculations, two positions instead of one. The number of positions the filter plane 504 is moved for each calculation is referred to as the stride.

In various examples, additional filters can be applied to the same input feature map 506 to produce additional output feature maps. For example, in one layer of the neural network, the neural network may be configured to conduct both edge detection, line detection, and texture detection, for which three different filters will be applied. In this example, the one layer can produce up to three output feature maps from the one input feature map 506.

With three-dimensional input data, in one layer of the neural network one filter may be applied to each of the input feature maps in the input data. Thus, for example, for three input feature maps, application of one filter can result in three output feature maps, and application of multiple filters can result in multiplication of the number of output feature maps produced.

In some example neural networks, the output feature maps produced by the computations for layer can become the input feature maps for the next layer. In some examples, the output feature maps may first be condensed, using, for example, pooling operations, to reduce the number of output feature map. The reduced number of output feature maps can then be used as the input feature maps of the next layer.

Figure 6:
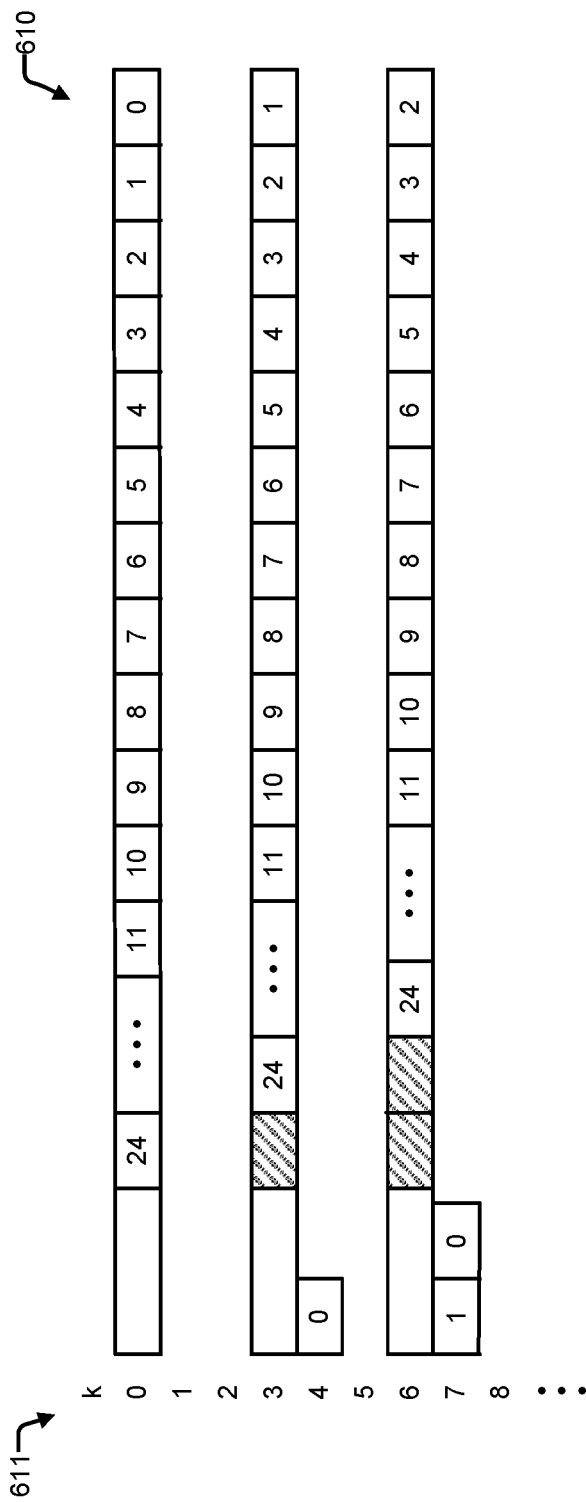
FIG. 6 is a diagram illustrating an example of the contents of memory banks.

FIG. 6 is a diagram illustrating an example of the contents of memory banks 610 that can be used to input data into a computational array in order to perform the convolution illustrated in FIG. 5. In the example of FIG. 6, each index 611 k indicates a memory bank, with index k=0 indicating the memory bank with the numerically lowest addresses. For the sake of clarity, only a subset of the memory banks 610 are shown.

In the example of FIG. 6, the elements of a first input feature map have been copied into each of banks 0, 3, and 6 of the illustrated memory banks 610. The numbers in the illustration indicate the index of the 5×5 input feature map illustrated in FIG. 5, with the indices numbers from left to right and top to bottom, in raster scan order. This example is further illustrated assuming that the memory banks 610 will be read from right to left when the copies of the input feature map is read for inputting into a computational array. In this example, each bank providing the input data for a different row of the computational array. For example, bank 0 will provide the data for row 0, bank 1 for row 1, bank 2 for row 3, and so on.

As illustrated in FIG. 5, in the computational array, a first element from the filter will be applied to (e.g., multiplied to) elements of the input feature map starting at element 0, a second first element will be applied starting at element 1 of the input feature map, a third filter element will be applied starting at element 2 of the input feature map, and so on.

Accordingly, as illustrated in FIG. 6, the first copy of the input feature map is placed with the first element at the rightmost address location of bank 0, so that the first data read from bank 0 will be the first element. The second copy is further shifted in bank 1 by one data word, so that the first data read from bank 3 is the second element. The third copy is shifted in bank 6 by two data words, so that the first data read from bank 3 is the third element. In various examples, copies of the data that are shifted can be zero padded in the address locations on the left, which would otherwise be occupied if the data were not shifted. Zero padding means that the zeros are written to the address locations, which are indicate here by hash marks.

The data of the input feature map can be written into the memory banks 610 in this staggered fashion by separately reading the data for each copy so that the element that is to be written furthest to the right is read first. Doing so, however, can require much of the same data to be read over and over again, for each memory bank into which the data is copied.

Using the master port and/or target port discussed above, the data for the input feature map can be read only once, and then be written into the memory in the staggered layout of FIG. 6. As discussed above, for the one read of the input feature map data, a target port can receive a write transaction for each of banks 0, 3, 6, and others, or the target port can receive a single write transaction and then duplicate the transaction for each of the banks. In either case, because the same data is being written to the designated memory banks, in various examples, to achieve the staggered layout, the copies of the data can be shifted to the right. This can result in the initial elements of the input feature map being pushed into a next memory bank, where incrementally higher addresses might be found. For example, in bank 3, shifting the data to the right by one element can result in the first element being pushed into bank 4, and in bank 6, the first and second element are pushed into bank 7. Pushing the data into subsequent banks in this manner may be inconsequential to the overall computation, as the banks may be large enough that the leftmost positions will not be read, or because the computation may not require address locations that deep to be read.

Though not illustrated here, a similar staggered layout can be used for a second and third input feature map, when the input data includes three input feature maps. For example, the second input feature map can be copied into banks 1, 4, 7, and so on, with the data being shifted incrementally for each bank. Similarly, the third input feature map can be copied into banks 2, 5, 8, and so on, also shifted incrementally for each bank.

Figure 7:
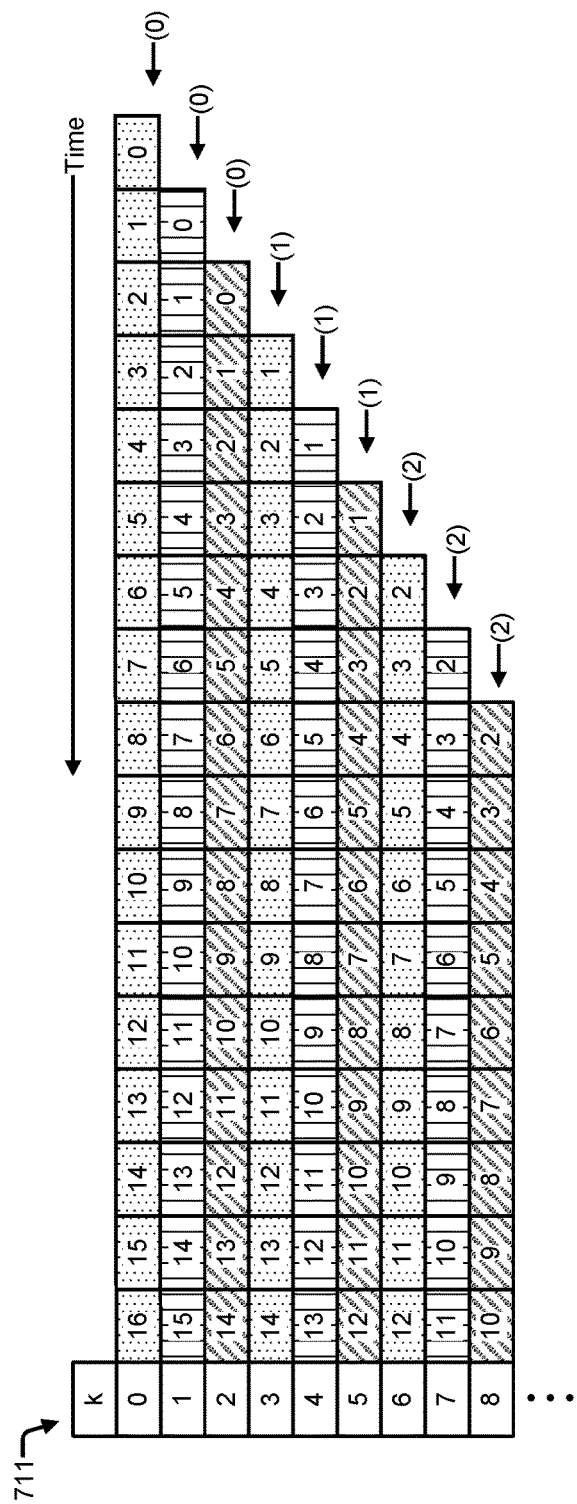
FIG. 7 includes a chart that illustrates reading of the input feature map data from the memory banks illustrated in FIG. 6.

FIG. 7 includes a chart 700 that illustrates reading of the input feature map data from the memory banks illustrated in FIG. 6 for inputting into the rows of processing engine array. For the sake of clarity, in FIG. 7, only the data for rows [0] through [8] are shown, and it is assumed the data for other rows will be input in a similar manner.

In the example chart 700 of FIG. 7, the first column indicates a row number 711, k, and the remaining columns indicate an index in an input feature map, as an indicator of the data that is read from the memory banks. In this example, time is indicated as progressing from right to left, such that the earliest data to enter the processing engine array is in the right-hand columns and the latest data to enter the processing engine array is in the left-hand columns. In some examples, each column can indicate the data input into the processing engine array in a different clock cycle. In the example of FIG. 7, numbers indicated in parenthesis indicate a filter index, also numbered in raster scan order, as an indicator of the filter element that is applied by the computations of a row.

The example chart 700 illustrates data being obtained for three input feature maps. The different input feature maps are indicated in FIG. 7 using different cross hatchings. Row[0] receives data for a first input feature map, and applies filter element (0) to this data. Row[1] receives data for the second input feature map, and also applies filter element (0) to this data. Row[2] receives data for the third input feature map, and also applies filter element (0) to this data.

The data for rows 0, 1, 2 are input into the processing engine array offset in time, with the data from row[1] entering one clock cycle after the data for row [0], and the data for row [2] entering one clock cycle after the data from row [1]. The delays are in keeping with the systolic computation being performed; that is, the data is multiplied horizontally by filter element (0), and then accumulated vertically, thus inputting the data at offsets avoids the data for the first input feature map accumulating with the data for the second input feature map or the third input feature map.

Further in this example, row[3] can also receive data for the first input feature map, and can apply filter element (1) to the data. In this row, as provided by FIG. 6, FIG. 7 illustrates that the input feature map is read from the memory bank starting at element 1 of the input feature map, instead of element 0. Additionally, for correct accumulation of the data into an output feature map, the data for row[3] is delayed by two clock cycles from when the data enters row[0].

Row[4] can similarly receive data for the second input feature map, starting at index 1, and delayed from when the data enters row[1]. Row[5] can similarly receive data for the third input feature map, starting at index 1, and delayed from when the data enters row[2].

Row[6] can also receive data from the first input feature map. In row[6], a third filter element (2) can be applied, starting at element 2 of the input feature map. Because the data for the first input feature map is written with element 2 being the first read from the memory bank that feeds row[6], element 2 will be the input first into row[6]. Row[7] can similarly be supplied with data from the second input feature map, and row[8] can similarly be supplied with data from the third input feature map.

The example illustrated in the chart 700 can be used, for example, when performing the computations for the first layer of a neural network. As discussed above, the inputs to the first layer may include three input feature maps, and applying filters to these input feature maps may occupy only three rows of the processing engine array. By duplicating the three input feature maps across multiple rows of the processing engine array, more of the processing engine array can be put to use when computing results for the first layer. Subsequent layers may have more input feature maps. For these layers, multicasting of the data in order to write the same data into multiple memory banks can be disabled. Additionally, shifting of the data to achieve a staggered arrangement can be disabled.

Figure 8:
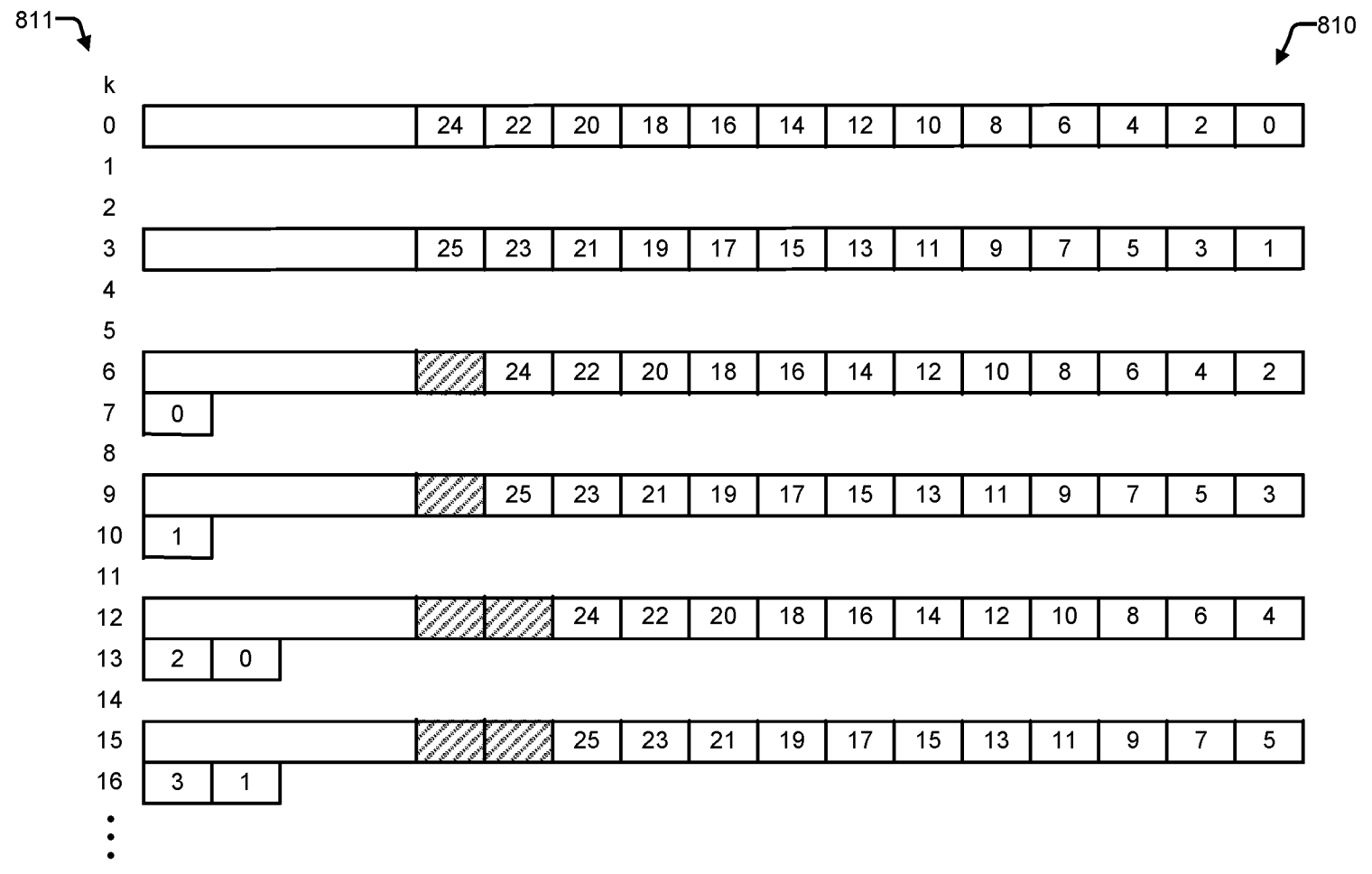

FIG. 8 is a diagram illustrating another example of the contents of memory banks 810 that can be used to input data into a computational array in order to perform the convolution illustrated in FIG. 5. In the example of FIG. 8, each index 811 k indicates a memory bank. For the sake of clarity, only a subset of the memory banks 810 are shown.

In the example of FIG. 8, the elements of one input feature map have been divided into even and odd indices. The even indices are written into banks 0, 6, 12, and so on, and the odd indices are written into banks 3, 9, 15, and so on. In this example, a first filter element will be applied to the data in bank 0, a second filter element to the data in bank 3, a third filter element to the data in bank 6, a fourth filter element to the data in bank 9, a fifth filter element to the data in bank 12, a sixth filter element to the data in bank 15, and so on for each duplicate of the even and odd indices. As discussed above, each filter element is not applied to every element of the input feature map. Thus, the data in banks 6 and 9 are shifted by one element, and the data in banks 12 and 15 are shifted by two elements. As discussed above, the shifting of the data may push elements of the input feature map into other banks, from which the data is not likely to be read. Shifting of the data in this manner enables the same data to be written into each of the banks, with only a simple shift operation needed to achieve the staggered layout. In some examples, copies of the data that are shifted can be zero-padded, meaning that zeros are written to address locations that would otherwise be occupied if the data were not shifted. Zero-padding is indicated in FIG. 8 by hash marks.

Additionally, splitting of the input feature map into even indices and odd indices can both increase the utilization of the computational array, and shorten the number of cycles needed to apply a filter to the input feature map.

Though not illustrated here, a second and third input feature map can similarly be written into the memory banks. For example, the even indices of the second input feature map can be written into banks 1, 7, 13, and so on, while the odd indices can be written into banks 4, 10, 16, and so on. Additionally, the even indices of the third input feature map can be written into banks 2, 8, 14, and so on, and the odd indices into banks 5, 11, 17, and so on.

Figure 9:
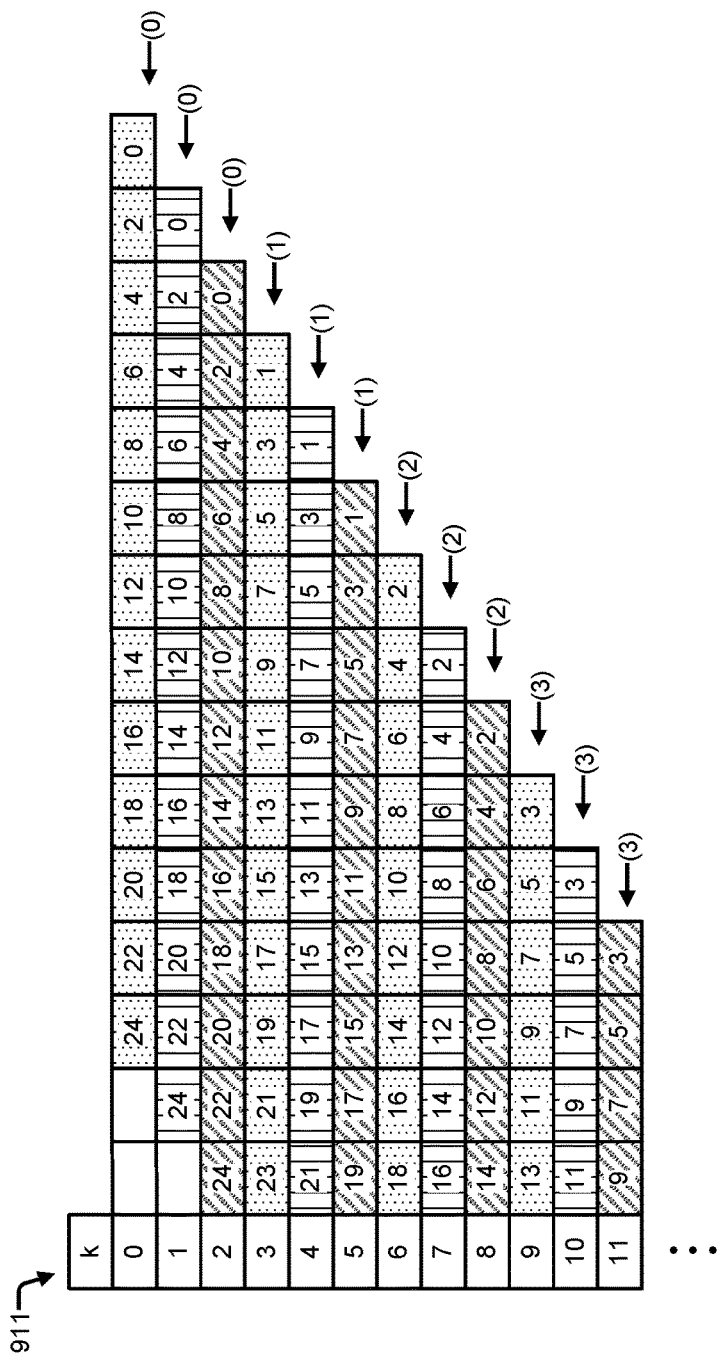
FIG. 9 includes a chart that illustrates reading of the input feature map data from the memory banks illustrated in FIG. 8.

FIG. 9 includes a chart 900 that illustrates reading of the input feature map data from the memory banks illustrated in FIG. 8 for inputting into the rows of a processing engine array. In FIG. 9, for the sake of clarity, only data for rows [0] through [11] are shown, and it is understood that the processing engine array can have many more rows (e.g., 128 or 256 or another number of rows).

In the example chart 900 of FIG. 9, the first column indicates a row number 911, k, and the remaining columns indicate an index in an input feature map, as an indicator of the data that is to be supplied. The elements of the input feature map are number from left to right and top to bottom. Time, in this example, is indicated as progressing from right to left, such that the first data to enter the processing engine array is on the right and the later data to enter the array is on the left. Numbers indicated in parenthesis indicate a filter index.

The example chart 900 illustrates data being obtained for three input feature maps. The different input feature maps are indicated in FIG. 9 using different cross hatchings. In this example, row[0] and row[3] both receive data for the first input feature map, with row[0] receiving the even-numbered indices and row[3] receiving the odd-numbered indices. A first filter element (0) is applied to the even-numbered indices, and second filter element (1) is applied to the odd-numbered indices. Application of the first filter element (0) to the even indices and the second filter element (1) to the odd indices reflects the operation illustrated in FIG. 5, where, in the first position 516, the first filter element is multiplied to the first index of the input feature map 506, and the second filter element is multiplied to the second index of the input feature map 506. In the example of FIG. 9, distributing operations for the first filter element (0) and the second filter element (1) can enable the processing engine array to perform the operations faster than when all of the data for one input feature map is input into one row.

The data for a second and third input feature map can similarly be split between two rows each. In the example of FIG. 9, the even indices of the second input feature map are input into row[1] and the odd indices are input into row[4]. The even indices of the third input feature map are input into row[2] and the odd indices are input into row[5]. The first filter element (0) is applied to in row[1] and row [2], and the second filter element is applied in row[4], and row[5]. The data for each consecutive row enters the processing engine array at one clock cycle intervals, to achieve correct accumulation of the data for the individual input feature maps.

In this example, the three input feature maps can occupy six rows of the processing engine array. To have the three input feature maps occupy more rows, which can then be used to apply more filter elements, the input selector circuit can duplicate the data into other rows. For example, the even indices for the first input feature map can also be input into row[6], and the odd indices can be input into row[9]. In this example, a third filter element (2) can be applied in row[6] and a fourth filter element (3) can be applied in row[9].

The data for the second and third input feature maps can similarly be duplicated to additional rows. In the chart 900, the even-numbered indices from the second feature maps are also input into row [7] and the odd-numbered indices are also input into row[10]. For the third input feature map, the even-numbered indices are also input into row[8] and the odd-numbered indices are also input into row[11]. Row[7] and row[8] further apply the third filter element (2) and row[10] and row[11] both apply the fourth filter element (3).

In various examples, duplication of the data to additional rows of the processing engine array can continue for any number of rows, though doing so may not be needed. For example, the filter plane of FIG. 5 includes only nine elements, thus to apply all nine filter elements, the data for the three input feature maps need only be replicated three more times. As another example, particularly for input feature maps that are larger than the output feature map illustrated in FIG. 9, software can divide the input feature map into smaller parts, and separately load the smaller parts into the memory banks. For example, one half of the input feature map can be loaded into banks for two rows, while the other half can be loaded into banks for a different two rows. In other examples, the input feature map can further be divided into smaller parts, with each of the smaller parts being loaded into different memory banks.

Figure 10:
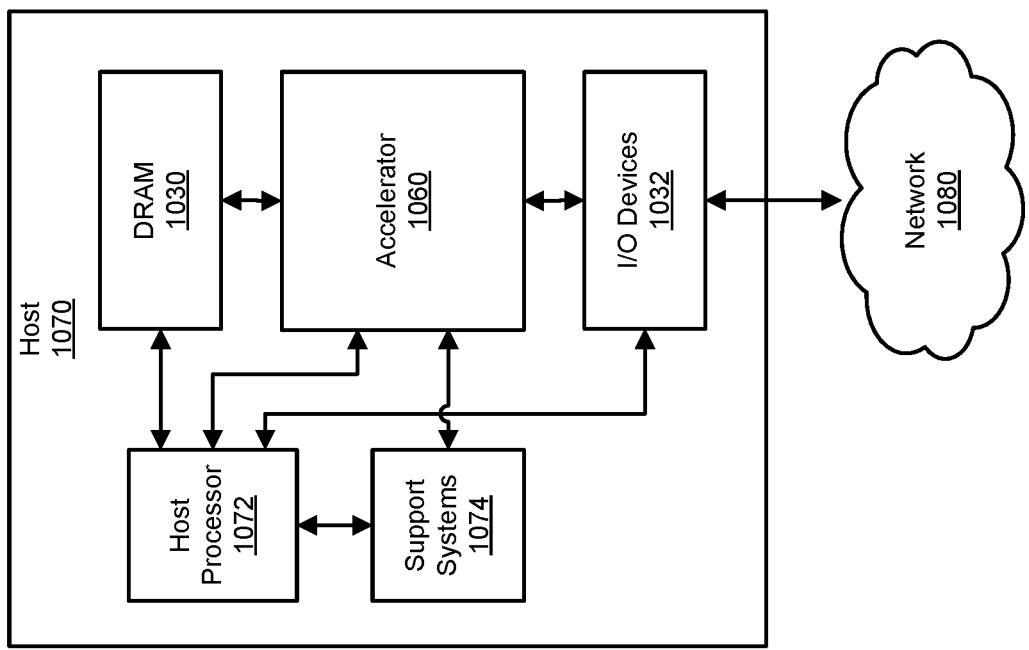
FIG. 10 includes a block diagram that illustrates an example of a host system.

FIG. 10 includes a block diagram that illustrates an example of a host system 1070 in which a neural network processor 1060 can be used. The example host system 1070 includes the neural network processor 1060, a host processor 1072, DRAM 1030 or processor memory, I/O devices 1032, and support systems 1074. In various implementations, the host system 1070 can include other hardware that is not illustrated here.

The host processor 1072 is a general purpose integrated circuit that is capable of executing program instructions. In some examples, the host processor 1072 can include multiple processing cores. A multi-core processor may include multiple processing units within the same processor In some examples, the host system 1070 can include more than one host processor 1072. In some examples, the host processor 1072 and the neural network processor 1060 can be one chip, such as, one or more integrated circuits within the same package.

In various examples, the host processor 1072 can communicate with other components in the host system 1070 over one or more communication channels. For the example, the host system 1070 can include a host processor bus, which the host processor 1072 can use to communicate with the DRAM 1030, for example. As another example, the host system 1070 can include an I/O bus, such as a PCI-based bus, over which the host processor 1072 can communicate with the neural network process 1060 and/or the I/O devices 1032, for example. In various examples, the host system 1070 can, alternatively or additionally, include other communication channels or busses, such as serial busses, power management busses, storage device busses, and so on.

In some examples, software programs executing on the host processor 1072 can receive or generate input for processing by the neural network processor 1060. In some examples, the programs can select an appropriate neural network to execute for a given input. For example, a program may be for language translation, and can select one or more neural networks capable of speech recognition and/or machine translation. In these and other examples, the programs can configure the neural network processor 1060 with the neural network to execute, and/or can select a neural network processing engine on the neural network processor 1060 that has previously been configured to execute the desired neural network. In some examples, once the neural network processor 1060 has started inference on input data, the host processor 1072 can manage the movement of data (such as weights, instructions, intermediate results, results of conditional layers, and/or final results) into or out of the neural network processor 1060.

In some examples, a software program that is using the neural network processor 1060 to conduct inference can read the result from a conditional layer from the neural network processor 1060 and/or from a storage location, such as in DRAM 1030. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinate by software.

The DRAM 1030 is memory that is used by the host processor 1072 for storage of program code that the host processor 1072 is in the process of executing, as well as values that are being operated on. In some examples, the data for a neural network (e.g., weight values, instructions, and other data) can be all or partially stored in the DRAM 1030. DRAM is a common term for processor memory, and though DRAM is volatile memory, processor memory can be volatile and/or non-volatile. Though not illustrated here, the host system 1070 can include other volatile and non-volatile memories for other purposes. For example, the host system 1070 can include a Read-Only Memory (ROM) that stores boot code for booting the host system 1070 at power on, and/or Basic Input/Output System (BIOS) code.

Though not illustrated here, the DRAM 1030 can store instructions for various programs, which can be loaded into and be executed by the host processor 1072. For example, the DRAM 1030 can be storing instructions for an operating system, one or more data stores, one or more application programs, one or more drivers, and/or services for implementing the features disclosed herein.

The operating system can manage and orchestrate the overall operation of the host system 1070, such as scheduling tasks, executing applications, and/or controller peripheral devices, among other operations. In some examples, a host system 1070 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1070. For example, some drivers can provide communication between the operating system and peripheral devices or I/O devices 1032. Alternatively or additionally, some drivers may provide communication between application programs and the operating system, and/or application programs and peripheral devices accessible to the host system 1070. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1032 can include hardware for connecting to user input and output devices, such as keyboards, mice, pens, tablets, voice input devices, touch input devices, displays or monitors, speakers, and printers, among other devices The I/O devices 1032 can also include storage drives and/or network interfaces for connecting to a network 1080. For example, the host system 1070 can use a network interface to communicate with storage devices, user terminals, other computing devices or servers, and/or other networks, among various examples.

In various examples, one or more of the I/O devices 1032 can be storage devices. In these examples, the storage device include non-volatile memory and can store program instructions and/or data. Examples of storage devices include magnetic storage, optical disks, solid state disks, flash memory, and/or tape storage, among others. The storage device can be housed in the same chassis as the host system 1070 or may be in an external enclosure. A storage device can be fixed (e.g., attached by screws) or removable (e.g., having a physical release mechanism and possibly a hot-plug mechanism).

Storage devices, the DRAM 1030, and any other memory component in the host system 1070 are examples of computer-readable storage media. Computer-readable storage media are physical mediums that are capable of storing data in a format that can be read by a device such as the host processor 1072. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. as used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1032 can be PCI-based devices. In these examples, a PCI-based I/O device includes a PCI interface for communicating with the host system 1070. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1074 can include hardware for coordinating the operations of the neural network processor 1060. For example, the support systems 1074 can include a microprocessor that coordinates the activities of the neural network processor 1060, including moving data around on the neural network processor 1060. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have much more limited capabilities than the host processor 1072. In some examples, the program executed by the microprocessor is stored on the hardware of microprocessor, or on a non-volatile memory chip in the host system 1070. In some examples, the microprocessor and the neural network processor 1060 can be on chip, such as one integrated circuit on the same die and in the same package.

In some examples, the support systems 1074 can be responsible for taking instructions from the host processor 1072 when programs executing on the host processor 1072 request the execution of a neural network. For example, the host processor 1072 can provide the support systems 1074 with a set of input data and a task that is to be performed on the set of input data. In this example, the support systems 1074 can identify a neural network that can perform the task, and can program the neural network processor 1060 to execute the neural network on the set of input data. In some examples, the support systems 1074 only needs to select an appropriate neural network processing engine of the neural network processor. In some examples, the support systems 1074 may need to load the data for the neural network onto the neural network processor 1060 before the neural network processor 1060 can start executing the neural network. In these and other examples, the support systems 1074 can further receive the output of executing the neural network, and provide the output back to the host processor 1072.

In some examples, the operations of the support systems 1074 can be handled by the host processor 1072. In these examples, the support systems 1074 may not be needed and can be omitted from the host system 1070.

In various examples, the host system 1000 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1000 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

FIG. 11 illustrates an example of process 1100 for operating an integrated circuit device that includes a master port that has been modified to enable the master port to perform multicast transactions. The master port can be an integrated circuit component of the integrated circuit device. The master port can be, for example, the master port illustrated in FIGS. 1, 3A, and/or 4A. The master port can further be configured with a first address range for a first target and a second address range for a second target. Requests received by the master port, which have addresses that map to the first address range or the second address range, each generate one transaction. The master port can further be configured with a multicast address range for the first target and the second target.

In various examples, the master port can have point-to-point connections with the plurality of targets. In these examples, the master port can use to send read and write transactions to the targets. A point-to-point connection is a bus structure on which the master port communicates with only one other component of the integrated circuit device. For example, the master port can be connected to first bus that is exclusively for transactions to the first target. The master port can further be connected to a second bus that is exclusively for the second target.

In some examples, the master port implements a bus protocol standard that does not include an ability to send one transaction to multiple targets.

At step 1102 of FIG. 11, the process 1100 includes receiving, at the master port, a request to transmit a transaction, the request including an address. The transaction can be a read request or a write request. The request can be received from an integrated circuit component of the integrated circuit device, for which the master port is providing an interface to a communication fabric.

At step 1104, the process 1100 includes determining that the address is within the multicast address range configured for the integrated circuit device.

At step 1106, the process 1100 includes generating a first transaction for the request, the first transaction including a first address that corresponds to the address. In some examples, generating the first transaction can include determining a first address in the first address range. The first address can correspond to the address included with the request received at step 1102. The first address can be determined, for example, by mapping the address to a corresponding location in the first address range. When the request is to write data, the first transaction can include data included with the request.

At step 1108, the process 1100 includes generating a second transaction for the request, the second transaction including a second address that corresponds to the address. In some examples, generating the second transaction can include determining a second address in the second address range, where the second address corresponds to the address received with the request. Determining the second address can include, for example, mapping the address to a corresponding location in the second address range. When the request is to write data, the second transaction can include the data.

In some examples, the first transaction and the second transaction can both include a same address. This address can be the address received with the transaction request, an address within the address range of the first target or the second target, an address in a first memory bank from a set of associated memory banks, and/or another address. In some examples, when the request includes data, and first transaction and the second transaction include copies of the data.

In some examples, the process 1100 can further include determining a first offset to include in the first transaction, wherein the first offset places data included in the first transaction a first number of bytes from a location of the first address. The offset value, can, for example, be combined with an index and then be added to the first address. The offset value and the index can be used to shift the data from a location indicated by the first address. In these examples, the process 1100 can further include determining a second offset to include in the second transaction, wherein the second offset places data included in the second transaction a second number of bytes from a location of the second address. In some examples, the first offset and the second offset are different, so that offset values can result in the data being shifted by different amounts for the first transaction and the second transaction. In some examples, the first offset and the second offset are the same.

At step 1110, the process 1100 includes transmitting the first transaction on a point-to-point connection to the first target.

At step 1112, the process includes transmitting the second transaction on a point-to-point connection to the second target.

In some examples, the first target and the second target are at different components of the integrated circuit device. For example, the first target and the second target can each include separate and unrelated memory components. In this example, the first transaction can read from or write to the memory of the first target, and the second transaction can read from or write to the memory of the second target.

In some examples, the first target and the second target are within memory of one component of the integrated circuit device. For example, the first transaction can be directed to a first memory bank of the component, and the second transaction can be direct to a second memory bank of the component.

In some examples, the process 1100 further includes receiving a first response for the first transaction and receiving a second response for the second transaction. In these examples the first response and the second response can each indicate successful completion of the first transaction and the second transaction, respectively. The process 1100 can further include, upon having the first response and the second response, transmitting a response to the request, the response indicating that the request was completed.

In some examples, the process 1100 further includes receive a first response for the first transaction, and determining that no response was received for the second transaction. For example, the master port can wait for a timeout period, during which the response for the second transaction is expected. As another example, the response may arrive, but indicate that the second transaction did not complete successfully. In this and other examples, the process 1100 can transmit a response to the request, the response indicating that the request did not complete.

In some examples, the integrated circuit device discussed above implements a processor. In these examples, the integrated circuit device can include a plurality of accelerator engines. The plurality of targets can include the plurality of accelerator engines. In some examples, the first target is a first accelerator engine from the plurality of accelerator engines and the second target is a second accelerator from the plurality of accelerator engines. In some examples, the first target is a first memory bank of an accelerator engine from the plurality of accelerator engines, and the second target is a second bank of the accelerator engine. In various examples, data included with the request received by the master port is input into a computational array of an accelerator engine. In some examples, the plurality of accelerator engines are operable to perform computations for executing a neural network.

FIG. 12 illustrates an example of a process 1200 for operating an integrated circuit device that includes a target port that has been modified to enable multicast transactions and staggered data writes. The integrated circuit device can include a computational array circuit and a memory that includes a plurality of banks. The memory can be coupled to the computational array circuit, and can be configured to input data into the computational array circuit. In various examples, the plurality of banks each input data into different rows from the computational array circuit. For example, the integrated circuit device can be operable to read copies of data from banks from the plurality of banks, and input the copies of the data into the computational array circuit for the computational array circuit to compute a result.

The target port can be an integrated circuit component of the integrated circuit device. The target port can be, for example, the target port illustrated in FIGS. 1 and/or 4B. The target port can be operable to receive read and write transactions from a plurality of master ports, wherein the target port has point-to-point connections with the plurality of master ports. A point-to-point connection is a bus structure on which the target port communicates with only one master port of the integrated circuit device. For example, the target port can have separate communication channels for each of the master ports with which the target port communicates. The target port can further be configured with a multicast address range, wherein the multicast range is associated with a plurality of indices corresponding to banks from the plurality of banks.

In some examples, the target port can further be configured with a second multicast address range, wherein the second multicast address range is associated with a different plurality of indices corresponding to different banks from the plurality of banks. In these examples, by using an address in the first multicast address range or the second multicast address range, a write transaction can be duplicated into different sets of memory banks, and/or with different offset addresses.

At step 1202 of FIG. 12, the process 1200 includes receiving, at the target port, a write transaction for the memory, the write transaction including an address, data, and an offset value.

At step 1204, the process 1200 can include determining that the address is in the multicast address range.

At step 1206, the process 1200 can include determining a first index from the plurality of indexes. In some examples, the index is determined from a count of write transactions received for the address. In these examples, the target port can receive multiple write transactions that include a same address within the multicast address range. In some examples, the index is determined from the address. For example, the target port can determine, that the address is within the address range of a specific memory bank, and from the memory bank determine the index. In some examples, the index can determined from a count of writes to the memory generated by the write transaction. In these examples, the target port can be operable to duplicate the write transaction for each index from the plurality of indices, wherein duplicating the write transaction causes the data to be written to multiple banks of the memory. Also in these examples, for each index from the plurality of indices, the data can shifted from the location indicated by the address by a different amount. Also in these examples, the target port can generate one completion response upon completing writing of the data to the multiple banks of the memory, and not once complete response for each duplicated write.

In various examples, the offset value indicates a number of data words in the data and the index indicates a bank from the plurality of banks, such that, when the plurality of banks is read at a same offset, a copy of the data output from each bank in the column of banks is staggered relative to other banks from the column of banks.

At step 1208, the process 1200 can include determining a second address by combining the first index and the offset value and adding a result to the address. For example, the target port can multiple the first index by the offset value, and add the result to the address to produce the second address. The second address can be shifted a certain number of data words from the location of the address, with the number of data words being indicated by the combination of the first index and the offset value.

At step 1210, the process 1200 can include writing the data to the memory using the second address, wherein using the second address shifts the data from a location indicated by the address.

In some examples, the process 1200 can further include transmitting, upon writing of the data completing, a completion response to the write transaction.

In some examples, the process 1200 can further include receiving, at the target port, a second write transaction for the memory, the second write transaction including a third address. In these examples, the process 1200 can further include determining that the second address is not in the multicast address range, and writing the data to the memory using the second address. In these examples, no duplication of the data occurs, and no shifting of the data occurs.

In some examples, the process 1200 can further include receiving, at the target port, a second write transaction for the memory, the second write transaction including the address, the data, and the offset value that were included in the write transaction received at step 1202. These examples can further include determining a second index from the plurality of indices, wherein the second index is different from the first index. The indexes can, for example, to used serially. The process 1200 can further include determining a third address by combining the second index and the offset value and adding a result to the address. The process 1200 can further include writing the data to the memory using the third address, wherein using the third address shifts the data by a different amount from the location indicated by the address. In some examples, the process 1200 can further include transmitting, upon completion of writing of the data using the second address, a first completion response to the write transaction, and transmitting, upon completion of writing of the data using the third address, a second completion response to the second write transaction.

In some examples, the integrated circuit device discussed above, can implement a processor. In these examples, the integrated circuit device can include a plurality of accelerator engines, wherein an accelerator from the plurality of accelerators includes the target port.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate example of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An integrated circuit device, comprising:
    an integrated circuit component implementing a master port, wherein the master port is coupled to a first bus for transmitting transactions to a first target, wherein the master port is coupled to a second bus for transmitting read and write transactions to a second target, wherein the master port is configured with a first address range for addressing the first target and a second address range for addressing the second target, wherein the master port is configured with a multicast address range for addressing both the first target and the second target, and wherein the master port is operable to:
    receive a first request to transmit a transaction, the first request including an address;
    determine that the address of the first request is within the multicast address range;
    mapping the address of the first request to a first address in the first address range, wherein the first address is at an equivalent location in the first address range as the address of the first request is in the multicast address range;
    generate a first transaction for the first request, the first transaction including the first address;
    mapping the address of the first request to a second address in the second address range, wherein the second address is at an equivalent location in the second address range as the address of the first request is in the multicast address range;

generate a second transaction for the first request, the second transaction including the second address;
transmit the first transaction on a first point-to-point connection to the first target;
transmit the second transaction on a second point-to-point connection to the second target;
receive a second request to transmit another transaction, the second request including a third address;
determine that the third address is within the first address range;
generate a third transaction for the second request, the third transaction including the third address; and
transmit the third transaction to the first target.

2. The integrated circuit device of claim 1, wherein the first bus is exclusively for transactions to the first target, and wherein the second bus is exclusively for transactions to the second target.

3. The integrated circuit device of claim 1, wherein the master port implements a bus protocol standard that does not include an ability to send one transaction to multiple targets.

4. An integrated circuit device, comprising:
a master port operable to send transactions to a plurality of targets, wherein the master port has point-to-point connections with the plurality of targets, wherein the master port is configured with a first address range for a first target and a second address range for a second target, wherein the master port is configured with a multicast address range for both the first target and the second target, and wherein the master port is operable to:
receive a first request to transmit a transaction, the first request including an address;
determine that the address is within the multicast address range;
generate a first transaction for the first request, the first transaction including a first address that corresponds to the address of the first request;
generate a second transaction for the first request, the second transaction including a second address that corresponds to the address of the first request;
transmit the first transaction on a point-to-point connection to the first target;
transmit the second transaction on a point-to-point connection to the second target;
receive a second request to transmit another transaction, the second request including a third address;
determine that the third address is within the first address range;
generate a third transaction for the second request, the third transaction including the third address; and
transmit the third transaction to the first target.

5. The integrated circuit device of claim 4, wherein the master port is further operable to:
receive a first response for the first transaction;
receive a second response for the second transaction; and
upon having the first response and the second response, transmit a response to the first request, the response to the first request indicating that the first request was completed.

6. The integrated circuit device of claim 4, wherein the master port is further operable to:
receive a response for the first transaction or the second transaction, wherein the response is a first response received for either transaction; and
upon receiving the response, transmit a response to the first request, the response to the first request indicating that the first request was completed.

7. The integrated circuit device of claim 4, wherein the master port is further operable to:
receive a first response for the first transaction;
determine that no response was received for the second transaction; and
transmit a response to the first request, the response to the first request indicating that the first request did not complete.

8. The integrated circuit device of claim 4, wherein the first target and the second target are at different components of the integrated circuit device.

9. The integrated circuit device of claim 4, wherein the first target and the second target are within different memory banks of one component of the integrated circuit device.

10. The integrated circuit device of claim 4, wherein the master port is further operable to:
determine a first offset to include in the first transaction, wherein the first offset places data included in the first transaction a first number of bytes from a location of the first address; and
determine a second offset to include in the second transaction, wherein the second offset places data included in the second transaction a second number of bytes from a location of the second address.

11. The integrated circuit device of claim 4, wherein a point-to-point connection is a bus structure on which the master port communicates with only one other component of the integrated circuit device.

12. The integrated circuit device of claim 4, wherein the integrated circuit device implements a processor, and further comprising:
a plurality of accelerator engines, wherein the plurality of targets includes the plurality of accelerator engines.

13. The integrated circuit device of claim 12, wherein the first target is a first accelerator engine from the plurality of accelerator engines and the second target is a second accelerator from the plurality of accelerator engines.

14. The integrated circuit device of claim 12, wherein the first target is a first memory bank of an accelerator engine from the plurality of accelerator engines, and the second target is a second memory bank of the accelerator engine.

15. The integrated circuit device of claim 12, wherein data included with the first request is input into a computational array of an accelerator engine from the plurality of accelerator engines.

16. The integrated circuit device of claim 15, wherein the computational array is operable to perform systolic array computations.

17. The integrated circuit device of claim 12, wherein the plurality of accelerator engines are operable to perform computations for executing a neural network.

18. The integrated circuit device of claim 4, further comprising:
a set of registers operable to store values describing the first address range, the second address range, and the multicast address range;
a comparison circuit operable to use the values stored in the set of registers to determine whether a particular address is in one of the first address range, the second address range, or the multicast address range; and
a transaction management circuit operable to generate the first transaction and the second transaction and to determine whether the first transaction and the second transaction have completed.

19. A method for operating an integrated circuit device, comprising:

receiving, at a master port of the integrated circuit device, a first request to transmit a transaction, the first request including an address;

determining that the address is within a multicast address range configured for the master port, wherein the master port is further configured with a first address range for a first target and a second address range for a second target, and wherein the master port has point-to-point connections with a plurality of targets including the first target and the second target;

generating a first transaction for the first request, the first transaction including a first address that corresponds to the address of the first request;

generating a second transaction for the first request, the second transaction including a second address that corresponds to the address of the first request;

transmitting the first transaction on a point-to-point connection to the first target;

transmitting the second transaction on a point-to-point connection to the second target;

receiving a second request to transmit another transaction, the second request including a third address;

determining that the third address is within the first address range;

generating a third transaction for the second request, the third transaction including the third address; and transmitting the third transaction to the first target.

20. The method of claim 19, further comprising:

mapping the address of the first request to a corresponding first address in the first address range, wherein the first address is included in the first transaction; and mapping the address of the first request to a corresponding second address in the second address range, wherein the second address is included in the second transaction.

21. The method of claim 19, wherein the first transaction and the second transaction both include a same address.

22. The method of claim 19, wherein the first request includes data, and first transaction and the second transaction include copies of the data.

23. The method of claim 19, wherein requests with addresses that map to the first address range or the second address range each generate only one transaction.

* * * * *